(12) United States Patent
Erinjippurath et al.

(10) Patent No.: US 9,864,243 B2
(45) Date of Patent: Jan. 9, 2018

(54) HIGH DYNAMIC RANGE DISPLAYS USING FILTERLESS LCD(S) FOR INCREASING CONTRAST AND RESOLUTION

(75) Inventors: Gopal Erinjippurath, San Francisco, CA (US); John Gilbert, Pacifica, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 1554 days.

(21) Appl. No.: 12/780,749

(22) Filed: May 14, 2010

(65) Prior Publication Data

US 2011/0279749 A1 Nov. 17, 2011

(51) Int. Cl.
*G02F 1/1347* (2006.01)
*G09G 3/34* (2006.01)
(Continued)

(52) U.S. Cl.
CPC ....... *G02F 1/13471* (2013.01); *G09G 3/3426* (2013.01); *H04N 13/0422* (2013.01);
(Continued)

(58) Field of Classification Search
CPC ............. G02F 1/1347; G02F 1/133504; G02F 1/133606; G02F 2001/133562;
(Continued)

(56) References Cited

U.S. PATENT DOCUMENTS 4,380,023 A 4/1983 Mir et al.
4,987,410 A 1/1991 Berman et al.
(Continued)

FOREIGN PATENT DOCUMENTS

EP 0745884 A2 5/1996
KR 10-2007-0103321 10/2007
(Continued)

OTHER PUBLICATIONS

Birendra Bahadur, Liquid Crystals Applications and Uses 1990, World Scientific, vol. 1, p. 193.*

*Primary Examiner* — Edward Glick
*Assistant Examiner* — David Chung

(57) ABSTRACT

A display provides increased contrast and resolution via first LCD panel energized to generate an image and a second LCD panel configured to increase contrast of the image. The second panel is an LCD panel without color filters and is configured to increase contrast by decreasing black levels of dark portions of images (making them blacker or darker) using polarization rotation and filtration. Preferably, the second LCD panel is of higher resolution than the first LCD panel. The panels may be directly illuminated or edge lit, and may be globally or locally dimmed monochrome or multi primary lights that may also include individual control of color intensities for each image or frame displayed. The panels may be placed in any order, but preferably are arranged such that active layers in each panel are as close together as possible. Brightness is maintained by the combination of reusing polarization between the panels and by not going through more than one set of color filters. Improved contrast is a result of using multiple light modulators in series.

16 Claims, 15 Drawing Sheets

(51) Int. Cl.
*H04N 13/04* (2006.01)
*G02F 1/1335* (2006.01)

(52) U.S. Cl.
CPC ..... *H04N 13/0434* (2013.01); *H04N 13/0447* (2013.01); *G02F 1/133606* (2013.01); *G02F 2001/133601* (2013.01); *G09G 2300/023* (2013.01); *G09G 2320/0646* (2013.01); *G09G 2360/16* (2013.01)

(58) Field of Classification Search
CPC ..... G02F 1/13471; G02B 5/02; G02B 5/0242; G02B 5/0278; G02B 5/0221; G02B 5/0226; G09G 2300/023; G09G 2310/0243; G09G 2340/0457; G09G 2340/14
USPC ................ 349/61–65, 74–83, 112; 359/599; 345/690
See application file for complete search history.

(56) References Cited

U.S. PATENT DOCUMENTS

| | | | |
|---|---|---|---|
| 5,280,371 A * | 1/1994 | McCartney et al. | 349/64 |
| 5,548,427 A | 8/1996 | May | |
| 5,589,963 A | 12/1996 | Gunning, III et al. | |
| 5,682,180 A | 10/1997 | Young et al. | |
| 5,751,390 A * | 5/1998 | Crawford et al. | 349/120 |
| 5,966,192 A * | 10/1999 | Higuchi et al. | 349/61 |
| 5,978,142 A | 11/1999 | Blackham et al. | |
| 6,118,904 A | 9/2000 | Detch | |
| 6,348,957 B1 | 2/2002 | Yamazaki et al. | |
| 6,788,360 B2 * | 9/2004 | Penterman et al. | 349/74 |
| 6,891,672 B2 | 5/2005 | Whitehead et al. | |
| 7,050,122 B2 | 5/2006 | Gibbons et al. | |
| 7,400,377 B2 | 7/2008 | Evans et al. | |
| 7,450,774 B2 | 11/2008 | Hahm | |
| 7,630,030 B2 | 12/2009 | Jang et al. | |
| 7,641,346 B2 | 1/2010 | Berman | |
| 7,916,223 B2 * | 3/2011 | Kitagawa et al. | 349/15 |
| 8,009,248 B2 * | 8/2011 | Nakai et al. | 349/74 |
| 2004/0008298 A1 | 1/2004 | Kwok et al. | |
| 2004/0057017 A1 * | 3/2004 | Childers et al. | 353/31 |
| 2004/0263942 A1 | 12/2004 | Lopez | |
| 2006/0109286 A1 * | 5/2006 | Damera-Venkata | G09G 3/007 345/690 |
| 2006/0139503 A1 * | 6/2006 | Larson et al. | 349/39 |
| 2007/0242028 A1 | 10/2007 | Kitagawa | |
| 2008/0088649 A1 * | 4/2008 | Ikeno et al. | 345/690 |
| 2009/0027598 A1 * | 1/2009 | Ikeno et al. | 349/77 |
| 2009/0096710 A1 * | 4/2009 | Raman | G09G 3/2011 345/1.1 |
| 2009/0213576 A1 | 8/2009 | Chang et al. | |
| 2009/0295707 A1 | 12/2009 | Furukawa et al. | |
| 2009/0304078 A1 | 12/2009 | Yuasa | |
| 2010/0079703 A1 * | 4/2010 | Chung et al. | 349/65 |
| 2011/0080421 A1 | 4/2011 | Capener | |

FOREIGN PATENT DOCUMENTS

| | | |
|---|---|---|
| KR | 10-2007-0103322 | 10/2007 |
| KR | 10-2008-0034820 | 4/2008 |
| WO | 2009/122329 | 10/2009 |

* cited by examiner

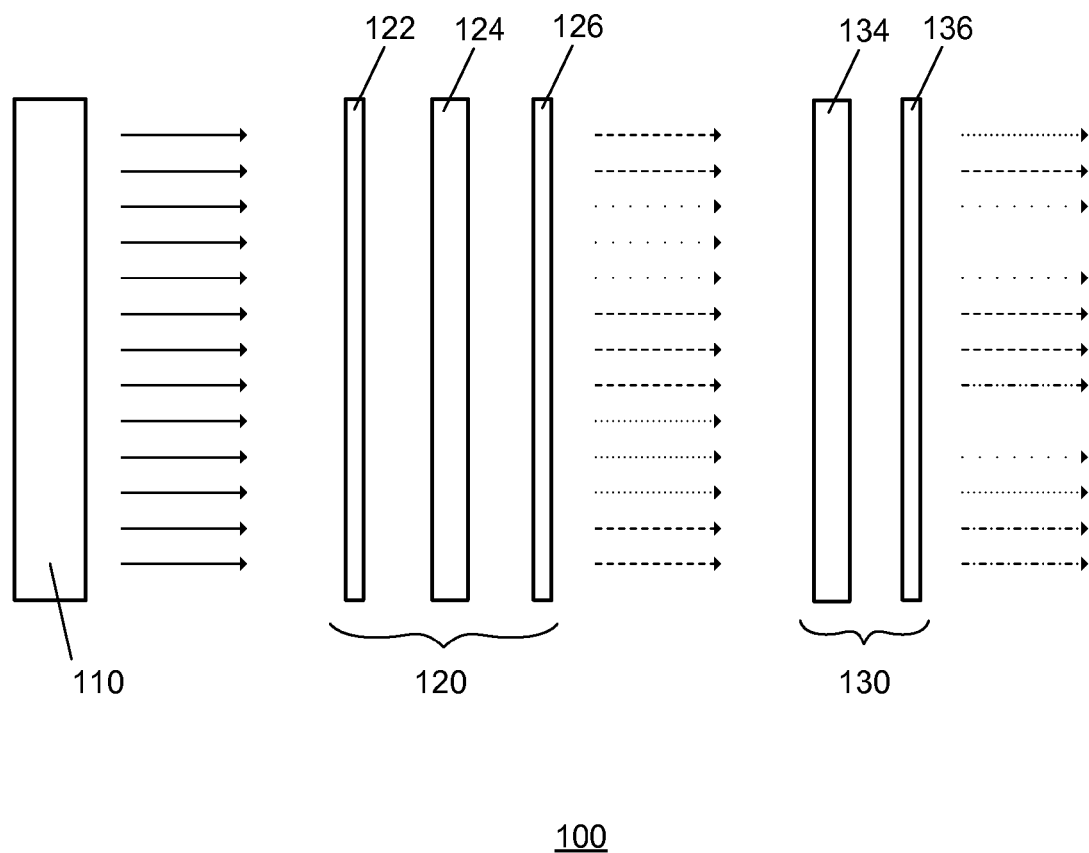

200

FIG. 4A
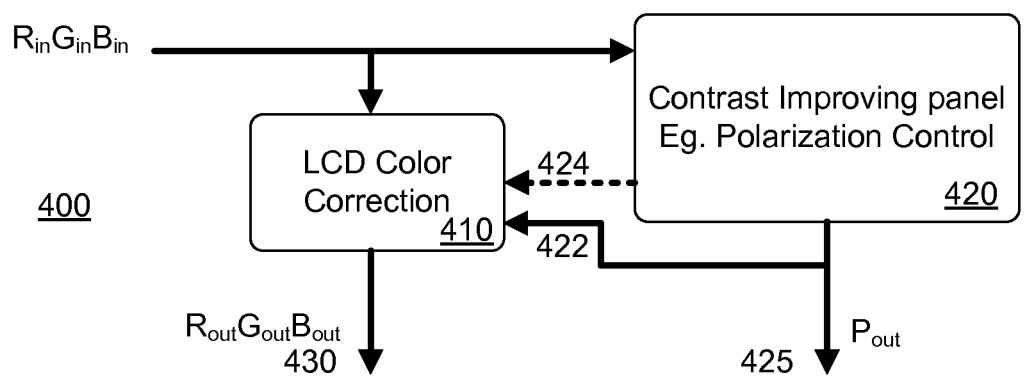
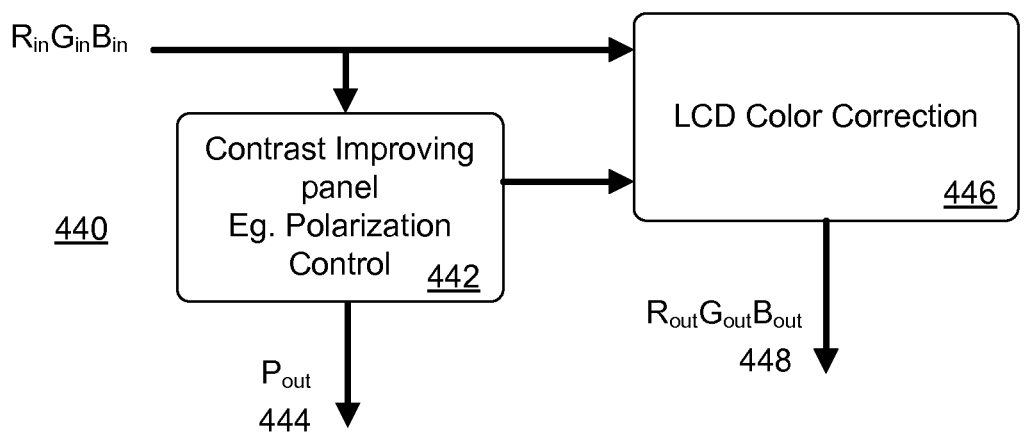

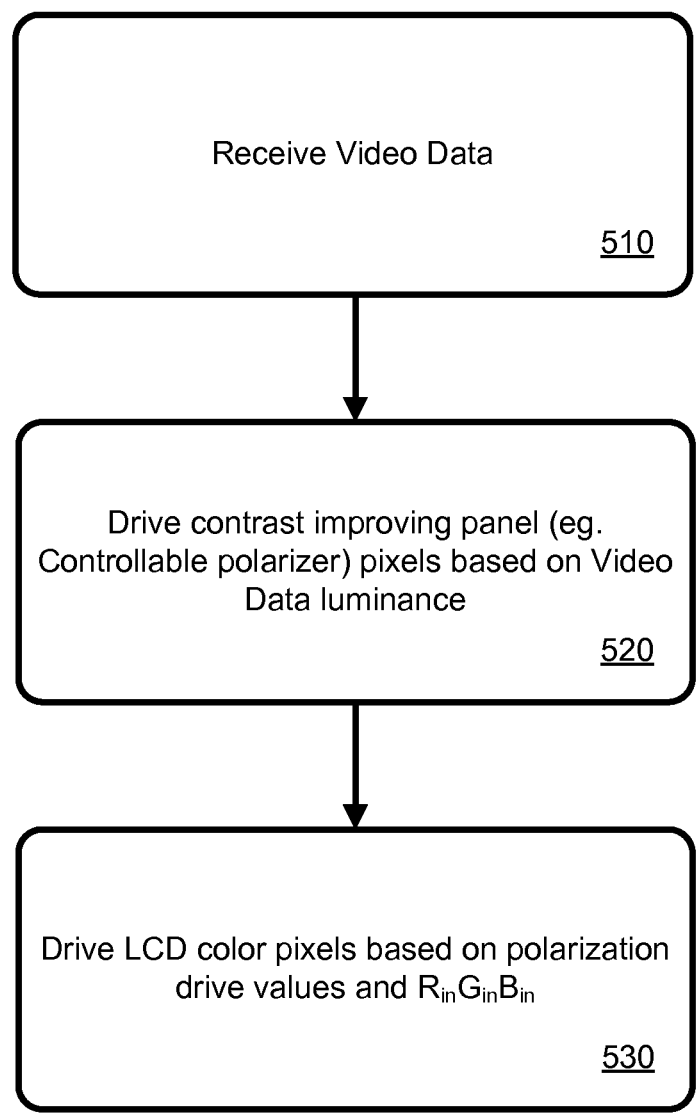

HIGH DYNAMIC RANGE DISPLAYS USING FILTERLESS LCD(S) FOR INCREASING CONTRAST AND RESOLUTION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Field of Invention

The present invention relates to High Dynamic Range Displays (HDR), and more particularly to HDR displays using dual modulation.

Discussion of Background

High Dynamic Range (HDR) displays are generally defined as having a dynamic range of greater than 800 to 1. Recent advances in technology have produced displays claiming contrast ratios of more than 1,000,000 to 1.

Generally speaking, these higher contrast ratio HDR displays utilize local dimming of the backlight that illuminates the LCD panel. An early patent in this area, U.S. Pat. No. 6,891,672, by Whitehead, Ward, Stuerzlinger, and Seetzen entitled "HIGH DYNAMIC RANGE DISPLAY DEVICES" describes the fundamental techniques. Such techniques include illuminating the LCD panel with an approximation of a desired image and then further modulating the approximation with the LCD panel so that it approaches the desired image.

Other forms of improving contrast have also been presented, including "darkening" of an LCOS projected image through the use of an LCD panel (Berman), and the use of multiple registered modulating layers or premodulators (e.g., Blackham U.S. Pat. No. 5,978,142, Gibbon U.S. Pat. No. 7,050,122, and others). However, commercially available HDR displays have deficiencies in reproducing starfields and other challenging images mainly due to parallax, backlight leakage, and other issues, and artifacts resulting therefrom.

SUMMARY OF THE INVENTION

The present inventors have realized the need to improve spatially localized contrast in LCD panels and other displays beyond existing attempts. In various embodiments, displays described in this document can be used for developing and commercializing a low cost consumer/prosumer grade high dynamic range display monitor. The hardware elements and algorithmic components described in this document can be developed into software plug-ins or as a software module in existing graphics cards to perform relevant tasks to turn existing displays (changing existing designs and/or retrofits) into high dynamic range displays.

In one embodiment, the present invention provides a high dynamic range display comprising a color LCD panel for generating an image (the image-generating panel) and an LCD panel without color filters (the contrast-improving panel) arranged to increase the contrast ratio and improve black levels (either making them darker or increasing the color and brightness fidelity of dark areas that are not intended to be completely black) in the generated image.

In another embodiment, the present invention provides a display comprising an image-generating panel and a contrast-improving panel wherein the contrast-improving panel comprises an LCD panel without color filters. The contrast-improving panel may operate in combination with an analyzing polarizer. The contrast-improving panel may be placed downstream of the image-generating panel. The resolution of the contrast-improving panel may be higher or lower than the image-generating panel. The image-generating panel may comprise, for example, a color filter based LCD panel having the same polarization rotating design as the contrast-improving panel. The contrast-improving panel may be, for example, abutted to the image-generating panel.

The invention includes a controller comprised of an image-generating panel energization module (e.g., a color module and/or a color correction module) and a contrast-improving panel energization module (e.g., a contrast-improving control module). The controller may be connected, for example, to energize both the image-generating LCD and the contrast-improving LCD with control data produced by the corresponding energization module(s). Energization of the image-generating panel may be based in part on feedback from the contrast-improving panel energization module to the image-generation panel energization module.

The controller may be configured, for example, to input data from a media source of a standardized high resolution and contrast, or higher (e.g., High Definition VDR), or other image types. The image-generating panel may be selected to be capable of producing an image of the standardized high (or other) resolution. The contrast-improving layer is configured to increase contrast using, for example, a different resolution than the image-generating panel. Preferably, the resolution of the contrast enhancing panel is higher than the image generating panel (but may be equivalent or less).

The present invention includes a display comprising a contrast-improving panel, which may comprise, for example, an LCD panel without color filters. The display may include another modulators such as a color-panel, and, the contrast-improving panel may have a higher resolution than the other modulator or modulators. The display may include, for example, a set of diffusers, including a relatively coarse diffuser configured to diffuse light from a backlight of the display, and a relatively fine diffuser configured to mask high frequency details or uncontrolled features in light modulated by the contrast-improving panel. The contrast-improving panel may be located between the set of diffusers and upstream of the other modulator(s).

The present invention includes displays where the image-generating panel comprises a color filter layer, an active layer, and a polarization filter layer, and the contrast-improving panel comprises an active layer and a polarization filter layer. The layers of the image-generating panel and the contrast-improving panel may be preferably arranged, for example, so as to place the active layers of the image-generating panel and the contrast-improving panel as close together as possible.

The image-generating layer is backlit by at least one type of light source. The light sources may comprise, for example, of CCFLs, LEDs, and OLEDs. These may be directly illuminating or the light can be carried through a light pipe, in the case of an edge lit configuration. In one embodiment, the array of light sources comprises at least one of the following: White or broad spectrum light sources, RGB light sources, RGBW light sources, RGB plus one or more additional primary light sources, or other multi-primary light source color combinations. The array of light sources (e.g., edge-lit light sources) may be locally dimmed.

In one embodiment, the light sources comprise different colors and each color's brightness is individually controllable.

In one embodiment, the display includes a contrast-improving layer (e.g., contrast-improving panel) that is backlit by an array of light sources, and the backlight and contrast-improving panels are arranged such that light passing through the contrast-improving panel from the backlight illuminates the image-generating panel. The contrast-improving panel may produce, for example, a base version of an image to be displayed by the display and the image-producing panel further modulates the base image to produce the image to be displayed. The base image comprises, for example, brightness intensity in proportion to brightness intensities of the image to be displayed. The brightness intensity of the base image may be a sharper image than the image to be displayed. In one embodiment, the base image is a blurred approximation of brightness levels in proportion to brightness levels of the image to be displayed.

In similar and other embodiments, the invention includes a controller connected to an image-generating panel and a brightness-improving panel and is configured to provide first-processed image data to the image-generating panel and second-processed image data to the brightness-improving panel, wherein the first-processed image data is produced in part based on image data input from a media source and feedback from production of the second-processed image data. The first-processed image data may comprise a full-color high-resolution version of the input image data, and the second-processed image data may comprise a mapping of brightness levels proportional to the input image data.

The invention may be implemented as a display or as a system and portions of the invention may be conveniently implemented as a method, for example, in programming on a general purpose computer, or networked computers, and the results may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a schematic diagram of a high dynamic range display according to an embodiment of the present invention;

FIG. 4A is an architecture and an alternative architecture of an electronic device that generates energization signals for LCD panels and contrast-improving panels according to an embodiment of the present invention;

FIG. 5 is a flow chart of a process for energizing a high dynamic range display according to various embodiments of the present invention;

DESCRIPTION OF THE PREFERRED EMBODIMENTS

Figure 2A:
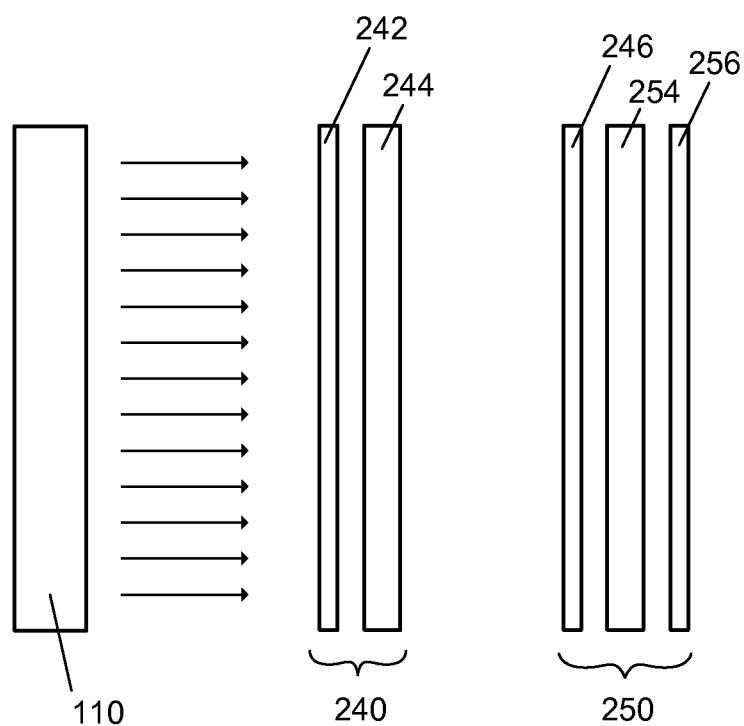
FIG. 2A is a schematic diagram of a high dynamic range display according to another embodiment of the present invention.

Referring now to the drawings, wherein like reference numerals designate identical or corresponding parts, and more particularly to FIG. 1 thereof, there is illustrated a new construction for a high dynamic range display 100 according to an embodiment of the present invention. The display 100 includes a backlight 110 which may be a standard CCFL or other broadband lighting source (e.g., LEDs, OLEDs, etc.). In addition, the backlight may be direct lit (light source(s) directly illuminating downstream modulation panels) or edge lit (as is popular in many thin screen LCD display designs). Further yet, the backlight may be constant, globally dimmed, or locally dimmed. The light source for this display can be white, controllable luminance, or multiple color driven.

The backlight 110 illuminates downstream modulators, including, in this example, an LCD panel 120 which modulates the backlight in intensity and color. A controllable polarizer (or contrast-improving panel) 130 further modulates the light as to polarity (and which may then be attenuated by a polarization layer to effect an intensity modulation of the output light).

The LCD panel 120 is constructed to include an initial polarizing layer 122, which may be for example, any of a reflective polarizer, an absorptive polarizer, or a polarization converter, or another device that provides an initial uniform polarization orientation from which downstream modulations are to be based. Preferably, the initial polarizing layer 122 is a reflective polarizer so that light that the reflected light may be "re-cycled" by reflection into and then back out of the optical cavity of the backlight 110. An active layer 124 comprises liquid crystals (e.g., twisted nematic) and color filters (e.g., typically RGB). The liquid crystals are oriented based on an energization of the active layer intended to rotate or change polarization of light passing through the filters. A passive polarization analyzer 126, which may be, for example, an absorptive polarizing layer that filters out (or passes) light of a predefined polarization as changed by the liquid crystals.

The controllable polarizer (contrast-improving panel) 130, may be, for example, the active elements of an LCD panel (e.g., a TN layer) combined with a passive polarizer (e.g., active layer, or active elements 134 and passive polarizer 136). The controllable polarizer 130 may be, for example, an LCD panel without color filters. As shown, the initial polarizer of this second LCD panel may be removed, relying, in this specific case, on the passive polarizing analyzer 126 for an initial uniform polarization.

In the case of a constant backlight, the backlight 110 produces an initial light 112 which is constant or uniform. In other embodiments, the initial light 112 may be modulated, e.g., any of spatially modulated light, pre-modulated light, globally dimmed light, individual RGB dimmed, temporally modulated light, or others, and/or a combination of the above. The initial light 112 illuminates the first downstream modulator (note that additional optical elements may be placed at virtually any point in the light/image chain, including any of diffusers, collimators, DEV, Brightness Enhancement Films (BEFs), etc). Other optical elements including reflectors may also be utilized depending on the design (e.g., side lit display designs may utilize, for example, a reflector/diffuser combination to redirect and diffuse light from a side light path that is mainly parallel to a display screen to a light path that is mainly perpendicular to the display screen.

The image-generating panel 120 modulates the initial light 112 in a manner that is physically similar to a standard LCD display. The energization of the image-generating panel 120 is calculated to accommodate the design and use of the controllable polarizer 130 and is discussed in more detail further below. 1st modulated light 128 is emitted from the image-generating panel 120 and illuminates the contrast-improving panel 130.

The contrast-improving panel 130 further modulates the $1^{st}$ modulated light 128 in a manner that increases the contrast and, for example, resolution of the modulated light, resulting in a $2^{nd}$ modulated light, or, in this case, better described as final image light 138. The increased resolution results, for example, when the contrast-improving panel 130 has more pixels for a given area than the image-generating panel 120.

Increased spatial resolution may also result when the active elements 134 are of similar/same construction as active elements of the image-generating panel 120 (e.g., LCD panel 120 and contrast-improving panel 130 are the same except that the contrast-improving panel 130 has the color filters removed). Benefits may also be obtained when the pixels of the contrast-improving panel are of a different shape, offset, size (e.g., smaller or larger), orientation (e.g., 0, 45, or 90 degrees), or layout compared to the image-generating panel.

The active elements 134 rotate polarization of individual "pixels" of the $1^{st}$ modulated light 128 based on a desired local dimming effect. Pixels in quotations because the pixels of first modulated light 128 may be different from pixels of the active elements 134. In the case where a design utilizes an LCD panel (e.g., LCD panel 120) having active elements that are the same as active elements 134, the pixels of the active elements 134 are still different from the pixels of the LCD panel 120 because the pixels of the LCD panel 120 each include three active elements (one for each Red, Green, and Blue filter that forms each LCD pixel), where each element of the active elements 134 may be defined as a single pixel.

The active elements 134 further modulate the $1^{st}$ modulated light 128 on a pixel-by-pixel basis via the pixels of the active elements 134 by imposing a prescribed amount of polarization rotation. The modulation is then effected by passive polarizer 136 that absorbs amounts of light proportional to the light's difference in polarization as modulated upstream. The contrast-improving panel 130 is shown downstream from the image-generating panel 115, but may be placed upstream of the image-generating panel 115.

FIG. 2A is a schematic diagram of a high dynamic range display 200 according to another embodiment of the present invention. In FIG. 2A, a contrast-improving panel 240 (e.g., a controllable polarizer or modified controllable polarizer) is placed upstream of an image-generating panel 250. Backlight 210 illuminates the contrast-improving panel with light 218. The contrast-improving panel 240 produces modulated light 248, which is a locally dimmed version of the backlight 218. Modulated light 248 is further modulated for color and brightness by a color panel 250 (e.g., an LCD panel), producing final image light 258.

As shown, the contrast-improving panel 240 includes an initial polarizer 242, and an active elements panel 242 (e.g., TN layer w/o color filters). The color panel 250 is constructed with a polarizer 246 (e.g., an absorptive polarizer) which operates as both an initial polarizer for the color panel and as an analyzer for the active elements panel 242. A color active layer 254 (e.g., TN layer+color filters) modulate the light as to intensity and color, and a passive polarizer 256 effects the modulation by polarization based filtering.

FIG. 2A is a schematic diagram of a high dynamic range display 260 according to another embodiment of the present invention. The display 260 improves performance by the addition of appropriately designed diffusers. The additional diffusers include an upstream diffuser 272 and a mid-stream diffuser 274. Upstream diffuser is a "rough" diffuser that is designed to diffuse the backlight into an evenly distributed light source. In the case of locally dimmed backlight embodiment, the upstream diffuser is designed to cause the backlight to smoothly vary across pixels of the upstream modulator (e.g., contrast-improving panel 244 in this example).

The midstream diffuser is specifically designed to smooth light emitted from the upstream modulator (e.g., contrast-improving panel 244 in this example). Preferably, the midstream diffuser operates to remove and smooth rough edges of the lights emitted from each pixel of the upstream modulator. To do so, the midstream diffuser is, for example, a diffuser that is of higher diffusion resolution (e.g., diffuses smaller features) than the upstream diffuser and is capable of maintaining the modulated resolution of light emitted from the upstream modulator. For example, FIG. 2C provides graphs that illustrate an approximate resolution of modulated light 280 in an on-off pattern as might be emitted from a contrast-improving panel or other upstream modulator. The midstream diffuser then operates to remove sharp edges and smooth the emitted light while preferably maintaining as much peak brightness and darkness as possible as shown by diffused light 285.

Diffused light 285 takes away the sharp edges (e.g. higher frequencies) of the upstream-modulated light and is sufficient to "break-up" or prevent the formation of moiré patterns that typically develop as artifacts in displays with various combinations of grid like panels and/or other optical elements. Also worth further discussion is that the diffused light 285 emitted from the mid-stream diffuser 274 is preferably at an entirely different level of diffusion compared to the diffused light emitted from the upstream diffuser 272. The upstream diffuser may, for example, cause the backlight to smoothly vary from one lighting element in the backlight to the next. In contrast, the mid-stream diffuser may, for example, provide smooth variances of lighting within a single pixel and mix light only from directly adjacent pixels. In one embodiment, the upstream and mid-stream diffusers differ in diffusion coarseness by, for example, an order of magnitude or more. In fact, best results may occur with an even much greater differential in resolution between the upstream and midstream diffusers.

In one embodiment, the upstream diffuser mixes and smoothes light from multiple light sources in the backlight while the midstream diffuser smoothes light on the order of single contrast-improving size pixels. In another embodiment, the upstream diffuser may be described as mixing light such that a single pixel of the upstream diffuser is illuminated by a plurality of light sources in the backlight, and the mid-stream diffuser may be described as mixing light on a sub-pixel level (sub-pixels of the upstream modulator). In one embodiment, the upstream diffuser is a rough diffuser compared to a relatively fine mid-stream diffuser. In one embodiment, the mid-stream diffuser provides diffusion at less than a sub-pixel resolution. In another embodiment, the mid-stream diffuser comprises a diffuser with a spatial transfer function that either cuts-off, removes, repositions, or eliminates high frequency elements of light that would otherwise be emitted. In another embodiment, the mid-stream diffuser may consist of a material that diffuses light more in one direction than in another to compensate for the non-squareness of the upstream pixels.

In yet another embodiment, the mid-stream diffuser comprises a diffuser that preserves enough detail such that the resolution of the modulated light is not altered (e.g., resolution not altered, but higher frequency details are no longer present). The mid-stream diffuser may be designed to mask high frequency details in the light modulated by the contrast-improving panel. For example, the mid-stream diffuser may comprise an optical low-pass filter that passes the lowest 4 harmonics (e.g., See FIG. 2C, the 4 lowest harmonics of 280 which approximately reproduces 285), but may be, for example, between 2-8 harmonics of the fundamental frequency. The mid-stream diffuser removes, for example, sub-pixel level features placed into the light stream by the contrast-improving panel. In most embodiments, the size of a pixel in the contrast-improving panel is smaller than a distance between the active panels (e.g., distance between the contrast-improving panel and the image-generating panel).

The coarseness of the mid-stream diffuser may, for example, be determined in part by a geometry of cells and surrounding areas of the contrast-improving panel. For example, if the contrast-improving panel comprises cells that are square with equivalent amounts of hardware (wires, cell walls, etc) on all sizes, then the coarseness of the midstream diffuser would generally be uniform in all directions. If the cells of the contrast-improving panel are rectangular then the coarseness of the midstream diffuser, assuming all other factors being equal, would be coarser in the direction corresponding to the longer side of the rectangle and finer in the direction corresponding to the shorter side of the rectangle.

The coarseness of the mid-stream diffuser may also be determined, for example, by a scale and/or physical or other measurable un-controlled features and/or imperfections in the cells of the contrast-improving panel. The coarseness is determined at a resolution that masks the uncontrollable features but still allows the resolution of the panel (in the form of modulated light) to pass mostly unaltered. For example, space between the cells of the contrast-improving panel may, for example, block light or pass some amount of un-modulated light. Blocked light or un-modulated light passed by the contrast-improving panel results in an uncontrolled or un controllable in the image being formed.

Other uncontrollable features may include, for example, differences in modulation in a cell not attributable to its energization level and/or non-uniformity within a cell—any of which may be due to, for example, manufacturing or component quality variances. In one embodiment, the coarseness of the mid-stream modulator is selected so that one or more of the uncontrollable features are at least one of removed, masked, or otherwise minimized through diffusion. In one embodiment, the uncontrollable features are different depending on a direction (e.g., horizontal and vertical), and each direction (at least two directions in a single diffuser) having different diffusion properties related to the different amounts of uncontrollable features found in those directions.

Note that above, the polarizer 246 had been used as both an analyzer for the up-stream modulator 244 and an initial orientation polarizer for downstream modulator 254. The mid-stream diffuser 274 may be specially constructed to include polarization or to maintain existing polarization. In the case where mid-stream diffuser 274 maintains polarization (e.g., a diffuser that does not substantially alter the polarization of light being diffused), then polarizer 246 operates as both the analyzer and initial orientation polarizer as described above. However, diffusers typically will impart more polarization alteration than is desirable and therefore the addition of a polarizer to diffusion layer 274 is desirable so that the light may be analyzed prior to diffusion and accompanying polarization changes. This additional polarizer will increase contrast at the expense of brightness. The present invention includes designing a display for either increased contrast or brightness by respectively including or forgoing an additional polarizer between active layers.

Figure 2B:
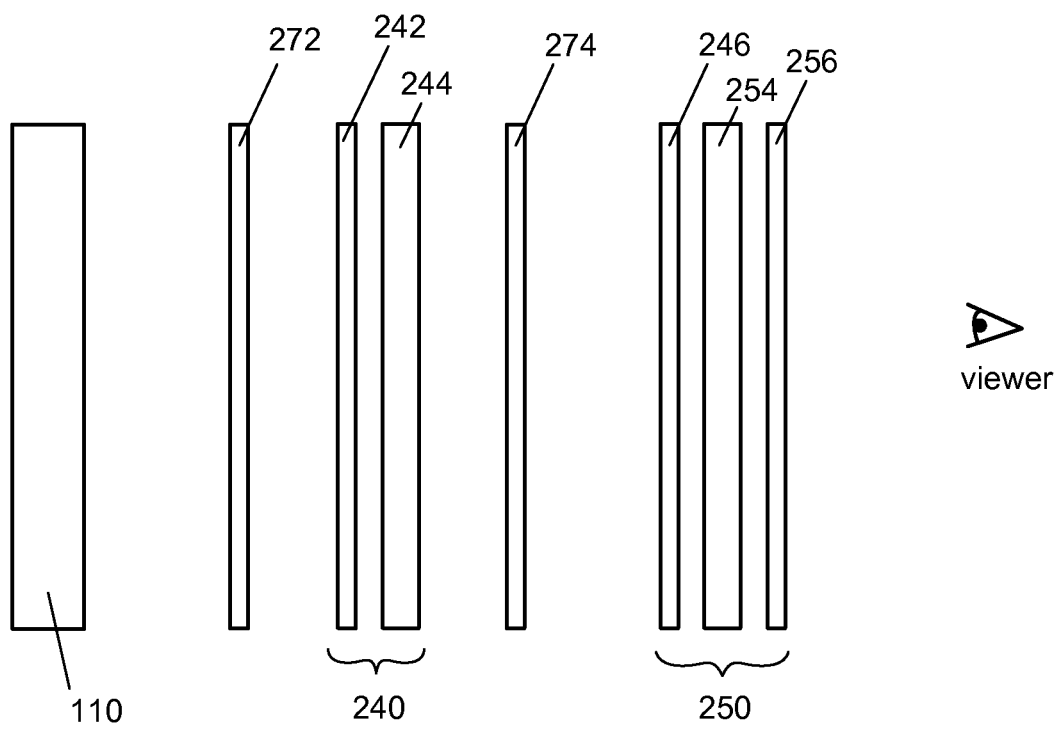
FIG. 2B is a schematic diagram of a high dynamic range display according to another embodiment of the present invention.
Figure 2C:
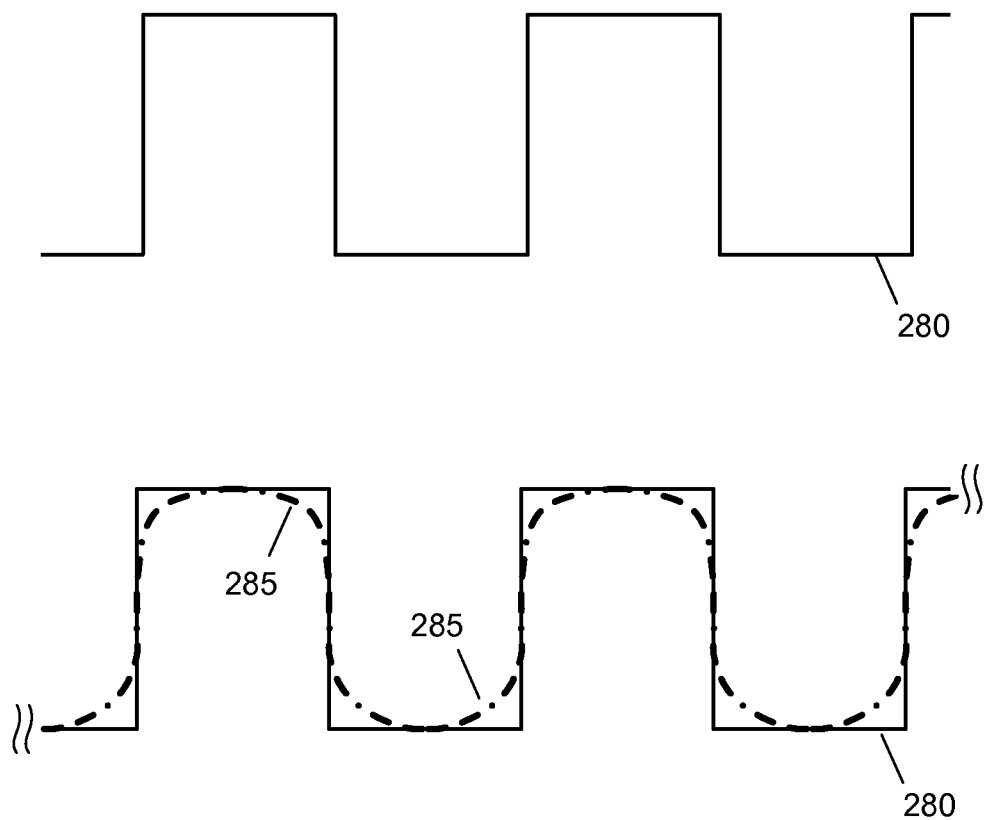
FIG. 2C is a graph illustrating high frequency features and diffusion according to an embodiment of the present invention.

The embodiments of FIG. 1, FIG. 2A, and FIG. 2B are constructed so that the modulators (e.g., contrast-improving panel 240 and image-generating panel 250) are in close proximity to each other, which, as one benefit, reduces parallax caused by a separation between the panels. In the present invention, the modulators are sandwiched together either directly or separated by thin films, air gaps, or optical stack items such as diffusers, collimators or other optical elements that are relatively thin compared to glass and other layers of an LCD panel. Even with the close proximity of the panels, parallax may occur, particularly when difficult images or patterns are displayed and viewed at off-normal angles. The present inventors have realized that a specific configuration of panels brings the active layers of the contrast-improving panel and the image-generating panel closer together, further reducing parallax effects.

Figure 3A:
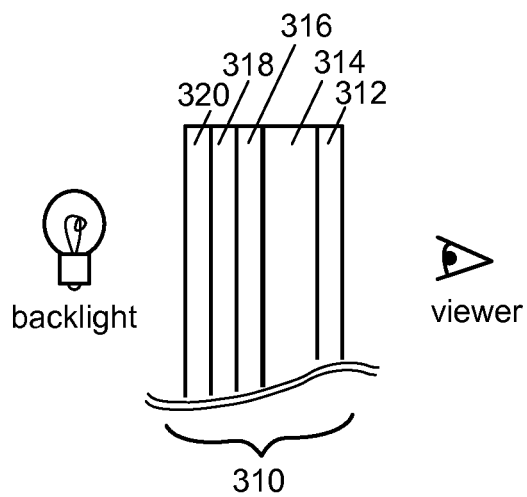
FIG. 3A is a drawing illustrating an arrangement of layers in a typical LCD panel.

Construction of a typical LCD panel 310 is illustrated in FIG. 3A. A first layer from the viewing side is a polarizing (analyzing) layer 312. Next, a relatively thick transparent substrate 314 (e.g., glass) is shown. Etched on the non-viewing side of the glass are, for example, wires and/or electronics for controlling a liquid crystal layer 316. Laminated together with the substrate and liquid crystal layer(s)

is a color filter layer 318 and an initial polarizing layer 320. In operation, a backlight illuminates the panel 310, polarizing layer 320 sets an initial polarization, color filters 318 provide the primary colors Red, Green, and Blue, and liquid crystal layer 316 rotates polarization of each R, G, and B light by an amount that each light is to be attenuated. The analyzing layer then absorbs amounts of the R, G, and B lights based on their respective polarizations as imparted by the liquid crystal layer.

Figure 3B:
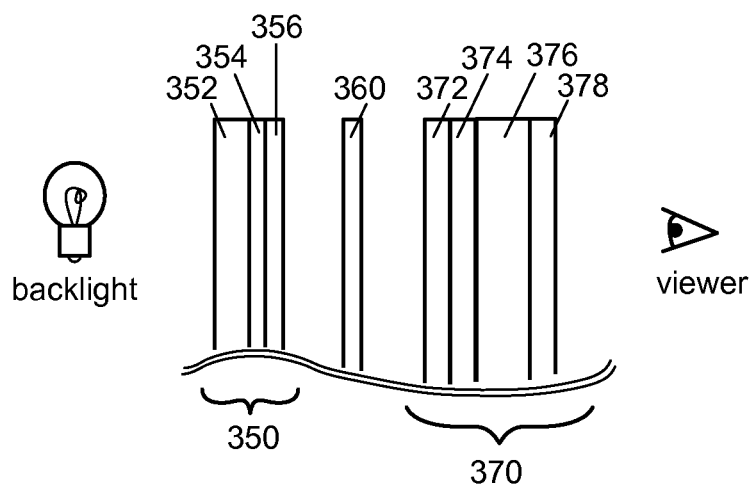
FIG. 3B is a drawing illustrating an arrangement of layers in an LCD panel and a brightness-improving panel according to an embodiment of the present invention.

FIG. 3B is a drawing illustrating an arrangement of layers in an image-generating panel and a contrast-improving panel according to an embodiment of the present invention. The arrangement is specifically designed to place the active layer of a contrast-improving panel 350 as close as possible to the active layer of the image-generating panel 370.

The layers of the contrast-improving panel 350 (from the backlight side) comprise a transparent substrate 352, an initial polarization layer 354, and an active layer 356 (e.g., controllable polarizing layer). A polarizer 360 (which may be a separate component or laminated together with either a contrast-improving panel 350 or an image-generating panel 370) performs double duty as both an analyzing polarizer for the contrast-improving panel 350 and an initial polarizing layer for the image-generating panel 370.

Continuing from the backlight side, the layers of the image-generating panel 370 comprise a color filter layer 372, active layer 374, substrate 376, and a polarization (analyzing layer) 378. Other arrangements of the layers may be utilized, including, for example, placing the polarization (analyzing) layer 378 on the backlight side of the substrate 376. The polarization (analyzing) layer 378 may also be placed on the backlight side of the color filter layer 372 and the active layer 374 may be placed as the first layer on the backlight side of the image-generating panel 370 (e.g., active layer—color filter layer—polarization (analyzing layer).

In an embodiment of the present invention, a contrast-improving panel and an image-generating panel are provided from similarly constructed LCD panels. The contrast-improving panel may, for example, be oriented backwards or upside down (flipped or inverted) relative to the LCD panel. This arrangement places the active layers of the contrast-improving panel and the image-generating panel closer together than would be in the case of similarly oriented panels of typical commercially available construction.

FIG. 4A provides an architecture of an electronic device 400 (e.g., electronic circuitry, software architecture, programmable device architecture, plug-in, etc., or combinations thereof) that generates energization signals for image-generating panels and contrast-improving panels according to an embodiment of the present invention. A signal comprising, for example, $R_{in}G_{in}B_{in}$, is provided and/or extracted from an image or video source (e.g., DVD, Cable, Broadcast, Satellite, Streaming video, Internet, removable media, thumb drive, etc.) to an LCD Color Correction module 410 and a Polarization Control module 420. The polarization control module prepares a $P_{out}$ signal 425 that is connected to a contrast-improving panel (e.g., controllable polarization panel). In essence, the $P_{out}$ signal 425 indicates which pixels of the contrast-improving panel should be attenuated and the amount of attenuation. When using a controllable polarizer as the contrast-improving panel, this is performed, for example, by rotating the polarization of pixels to be attenuated by an amount proportional to the amount of desired attenuation for that pixel. The $P_{out}$ signal 425 may be, for example, a luminance calculation from a desired image defined by the $R_{in}G_{in}B_{in}$ data.

Processing in the Polarization Control Module, may include, for example, both a characterization that produces a corrected response curve (e.g., correcting RGB values for a given luminance) and a non-linear function (e.g., transfer function) that increases or decreases local contrast (makes pixels darker or lighter). The non-linear function may, for example, brighten or darken pixels in a manner that take into account the relative brightness of neighboring pixels. As shown, $P_{out}$ is then forwarded (fed into) the LCD Color Correction module 410 (via line 422). Alternatively, intermediate data may be exclusively or additionally forwarded to the LCD Color Correction module (via 424). The intermediate data, may be, for example, partially processed data including any one or more steps performed to produce $P_{out}$ (e.g., characterization without applying the non-linear function).

Along with the $R_{in}G_{in}B_{in}$ data, the LCD Color Correction module prepares an $R_{out}G_{out}B_{out}$ signal 430 that is connected to control an image-generating panel (e.g., an LCD panel). The image-generating panel may be an LCD display, plasma display, or other type of display device.

In another embodiment, an electronic device 440 (e.g., electronic circuitry, software architecture, programmable device architecture, plug-in, etc., or combinations thereof) that generates energization signals for image-generating panels and contrast-improving panels according to an embodiment of the present invention. A signal comprising, for example, $R_{in}G_{in}B_{in}$, is provided from an image or video source (e.g., DVD, Cable, Broadcast, Satellite, Streaming video, Internet, removable media, thumb drive, etc.) to a Polarization Control Module 442 and an LCD Color Correction module 446. The Polarization Control Module 442 controls, for example, a polarizer that is physically located in a display and upstream of a corresponding color panel. The Polarization Control Module 442 may be configured to prepare modulation signals for a higher resolution than the resolution of the color panel (e.g., higher resolution in the number of controllable pixels and higher resolution in the total number of controllable elements in a given area of the corresponding panels). The polarization control module may be configured, for example, to control the active elements of a 1680×1050 active element panel.

An output luminance $P_{out}$ 442 is produced. In turn, an LCD Color Correction module 446 provides signals to control the corresponding color panel, which may be, for example, a 1920×1080 panel. The LCD Color Correction module 446 utilizes the video-in (RGB) signal plus results from the Polarization Control Module (e.g., luminance controlled by the upstream panels).

Figure 4B:
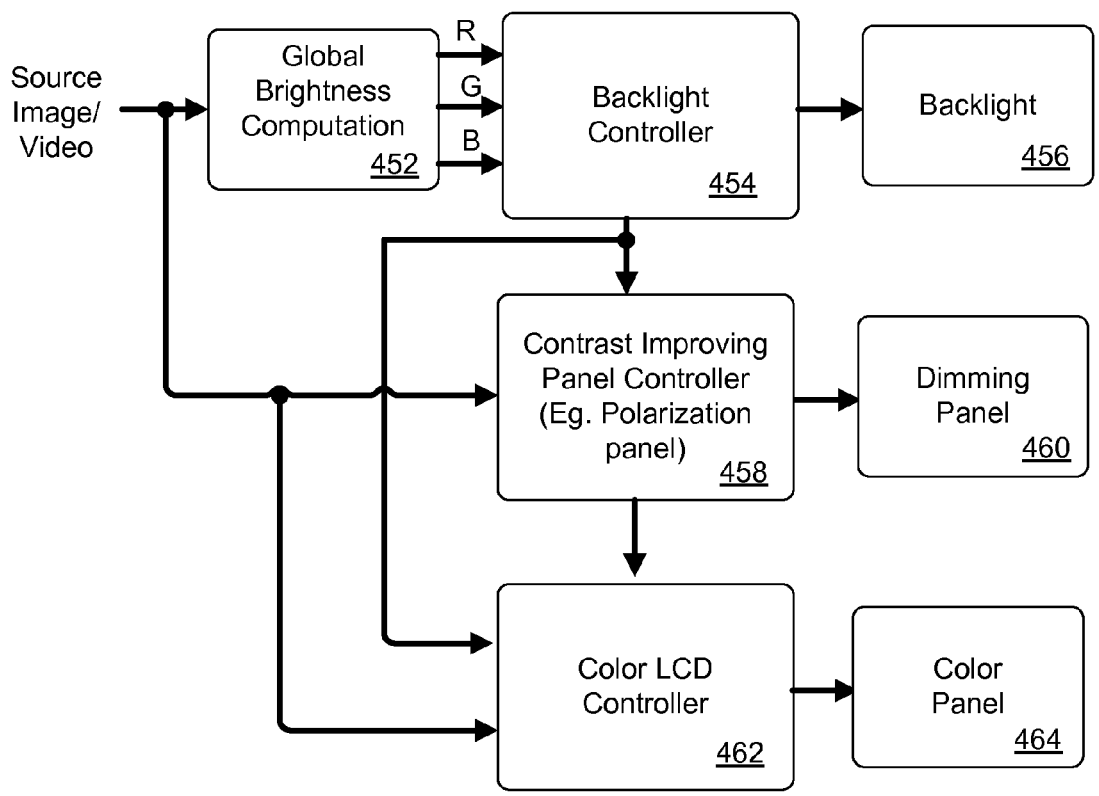
FIG. 4B is an architecture of another electronic device that generates energization signals for LCD panels and contrast-improving panels according to an embodiment of the present invention.

FIG. 4B is an architecture of an electronic device 450 (e.g., electronic circuitry, software architecture, programmable device architecture, plug-in, etc., or combinations thereof) that generates energization signals for image-generating panels and contrast-improving panels according to an embodiment of the present invention. A source image/video signal comprising, for example, $R_{in}G_{in}B_{in}$, is provided an image or video source (e.g., DVD, Cable, Broadcast, Satellite, Streaming video, Internet, removable media, thumb drive, etc.) to a global brightness computation module 452, which separates the light into its primary color components (e.g., R, G, and B) and provides that information to a backlight controller 454. A backlight control signal is generated, which may be, for example, a globally dimmed backlight value that is calculated (e.g., for each primary color value), which comprises, for example, an energization amount (or intensity) of individual primary colored lights in a backlight 456. The backlight is then energized according to the calculated backlight values for each primary.

In one embodiment, in the case of a locally dimmable backlight (e.g., a backlight that includes locally dimmed (or dimmable) light sources), the backlight controller may generate a spatially modulated backlight that illuminates downstream panels according to relative brightness in areas of the image (e.g., areas comprising, for example, each backlight pixel). The relative brightness may be computed, for example, based on the relative intensities of each primary color in a corresponding backlight pixel. Production of the spatially modulated backlight may also include, for example, consideration of the brightness of neighboring or nearby backlight pixels, and/or, in the case of video, brightness of pixels in preceding and/or subsequent image frames.

A Dimming/Polarization Controller 458 receives the backlight control signal and the input video/image signal, which are utilized to produce a contrast-improving control signal. The contrast-improving control signal specifies an amount of dimming produced by a contrast-improving panel 460. In various embodiments, the contrast-improving panel is of higher resolution than the image-generating panel (e.g., LCD panel) and may produce, for example, a very precise illumination profile.

In one embodiment, the image-generating panel is downstream from the contrast-improving panel and the higher resolution contrast-improving panel is utilized to produce an illumination profile that is intentionally blurred (blurred using the higher resolution capabilities of the contrast-improving panel as opposed to blurred because the contrast-improving panel is of lower resolution). The intentionally blurred image is blurred using the higher resolution capabilities of the display separate and apart from any blurring that occurs among or due to mixing of the backlights due to point spread functions or other qualities/orientations of the backlight or individual lights in the backlight. Although the aforementioned blurring is separate and apart from backlight blurring or mixing, embodiments of the invention may nonetheless include amounts of mixing or blurring of individual elements of the backlight.

A Color LCD Controller 462 receives the contrast-improving control signal, the backlight control signal, and the image/video signal which are utilized to produce an image-generating control signal that specifies the energization of the color panel 485 relative to the upstream illumination (e.g., in various embodiments the combined backlight and contrast-improving panel produce the upstream illumination) provided to the color panel 464.

Figure 4C:
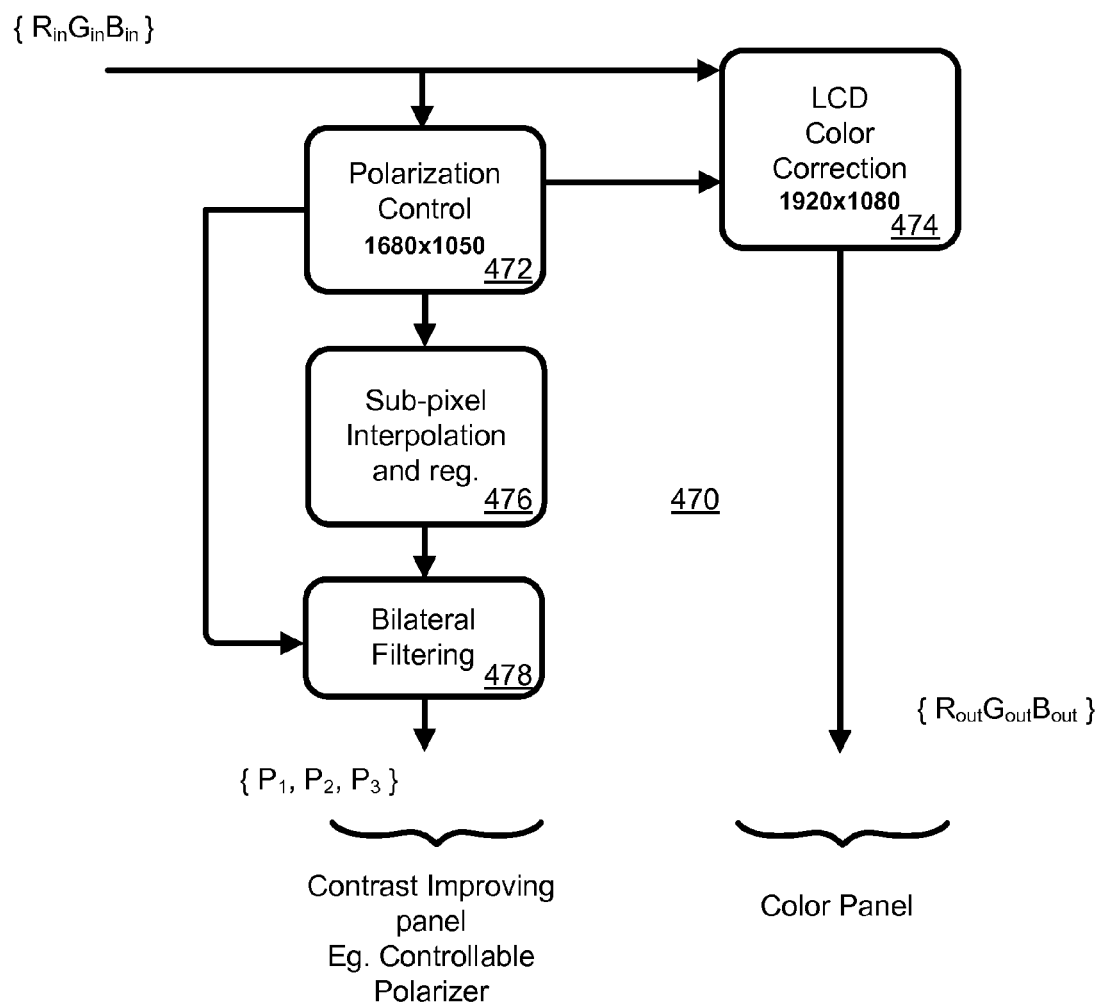
FIG. 4C is an architecture of yet another electronic device that generates energization signals for LCD panels and contrast-improving panels according to an embodiment of the present invention.

FIG. 4C is an architecture of controllers according to an embodiment of the present invention. An RGBin signal is provided to both a Polarization Control Module 466 and an LCD Color Correction Module 468. The LCD Color Correction Module may be configured to correct and produce an output for a 1920×1080 array of RGB pixels. The Polarization Control Module may be configured to control other resolutions, for example, 1680×1050 polarization cells.

The Polarization Control Module outputs to each of: the LCD Color Correction Module, a sub-pixel Interpolation and Registration module, and a filtering module. The sub-pixel interpolation module interpolates values for each pixel of the polarization control panel (e.g., each pixel may be considered a sub-pixel relative to the larger pixels of the image-generating panel). The interpolation and registration module allows the embodiment to handle multiple panels with different control resolutions and sizes. The spatial and range filtering module allows us to smooth the energization on the contrast-improving panel to get better viewing angle performance while maintaining edges and preserving the high frequency details in the image. This module also enhances the local contrast of this embodiment.

Filtering is performed based on the polarization control and preceding sub-pixel operations. The result is a P1, P2, and P3 output for controlling the controllable polarizer, and an output for controlling the color panel.

Figure 4D:
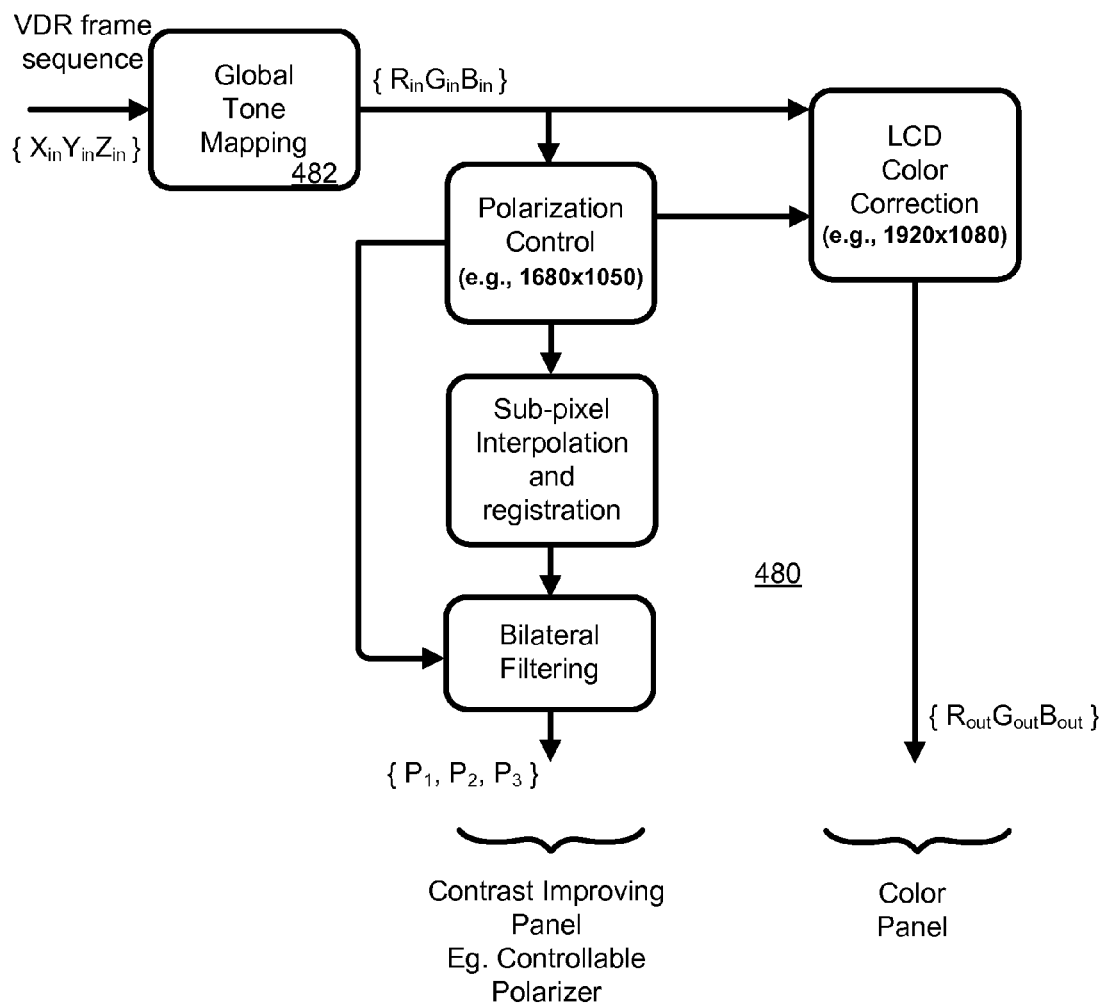
FIG. 4D is an architecture of still yet another electronic device that generates energization signals for LCD panels and contrast-improving panels according to an embodiment of the present invention.

FIG. 4D is an architecture of controllers according to an embodiment of the present invention that provides a framework for utilization of a High Dynamic Range (HDR) signal. The HDR signal could comprise an image and/or images (e.g., video) having a dynamic range that is equivalent to the dynamic range of the human visual system (HVS) on average. Since, on average, the HVS has greater dynamic range than most displays, a tone mapping algorithm is utilized to change the dynamic range of the image(s) or portions of the images so that they are within luminance range of the proposed display system. An HDR frame sequence {XinYinZin} is provided to a Global Tone Mapping Module 482, which outputs an RGB signal which is then fed to Polarization Control and LCD Color Correction Modules.

FIG. 5 is a flow chart of a process for energizing a high dynamic range display according to various embodiments of the present invention. At step 510 Image and/or video data (the method repeated in real time for each frame) is received. Luminance values are extracted from the image data and used to drive a contrast-improving panel (see step 520). An image-generating panel optically co-joined with the contrast-improving panel is driven based on the image data and the global or local dimming levels (step 530), or constant values representing the backlight color.

More details on a specific algorithm for driving the contrast-improving and image-generating panels are now discussed for producing a pixel accurate dual modulation displays. The architecture of two modulators of perhaps similar construction allows performance of local dimming in a sub-pixel (or higher resolution) fashion. Additionally, one of the modulators could have a different or the same resolution than the other in either dimension.

Pixels in the contrast-improving panel can be driven based on the luminance of a corresponding (or related) input pixel. The contrast-improving pixel may be a sub-pixel of an input pixel, a portion of an input pixel, or a pixel optically and precisely corresponding to an input pixel. Accurate characterization of the local dimming panel's output luminance response could be used to map the input RGB pixel values to a specific drive level (e.g., specific polarization rotation in this example).

Drive values may be provided, for example, via:

$$Y_{max}=Y_R+Y_G+Y_B$$

$$Y_{out}=Y_R*R_{in}+Y_G*G_{in}+Y_B*B_{in}$$

$$\text{drive}_{polarizer}=f_2(f_1(Y_{out}/Y_{max}))$$

The function $f_1$ is the polynomial characterizing the luminance response of the combined dual modulation system while linearly varying the local dimming panel's (polarizer's) control with the RGB color LCD drive is set to full white (maximum codewords).

The function $f_2$ a nonlinear transfer function that could represent the skew of the codewords with the luminance representing the nonlinear nature of the drive. The function could be approximated with either a simple gamma curve or a polynomial function. This drive computation can be used to calculate the drive for pixels of the contrast-improving panel (sub-pixels ($P_1$, $P_2$, $P_3$) of input pixels in the case where the contrast-improving panel has a similar construction and orientation to the image-generating panel). This function could also be used to improve the local contrast of the display using a nonlinear input-output relationship making dark regions darker and bright regions brighter.

The interaction between the image-generating panel and the contrast-improving panel (e.g., controllable polarizer) is represented in the color correction function. This function may utilize, for example, surfaces mapped from the characterization of the color primaries of the image-generating panel with the corresponding amount of local dimming (e.g., polarization) from the contrast-improving panel.

The resulting RGB drive may, for example, be calculated as follows:

$$R_{out} = f_3(R_{in}, f_4(R_{in}, Y_{out}))$$

$$G_{out} = f_5(G_{in}, f_6(G_{in}, Y_{out}))$$

$$B_{out} = f_7(B_{in}, f_8(B_{in}, Y_{out}))$$

Here, $f_4$, $f_6$ and $f_8$ define the characterization functions that define the output primary for an input primary pixel values and a computed $Y_{out}$. $f_3$, $f_5$ and $f_7$ define the nonlinear combination functions for combining the input primary and the output from the characterization functions.

The polarization control could be pre-computed in the LCD correction system to drive the LCD control plane independent of the polarization control signals computed in the dimming plane drive.

Sub-pixel control of the contrast-improving panel can be used to smooth out any parallax errors that are incurred by it use. Since sub-pixel control increases the implied resolution of the local dimming panel (e.g., polarizer), smoothing/dithering operations shall be more refined and accurate. By using a smoothing mask on the drive image to the modulating polarizer, such as, for example:

$$[\text{drive}_{polarizer}]_{(i,j)} = f_{int\ R}(\text{drive}_{polarizer})_{(i,j)})$$

where $f_{int}$ is the smoothing operator applied on a spatial radius of R sub-pixels. In a construction with 4 sub-pixels on the polarizer corresponding to every pixel on the color RGB LCD, the applied quad design would increase the resolution of the contrast-improving panel to twice that of the image-generating panel along both the width and the height directions.

In an embodiment, a source image may be processed through a nonlinear function to modulate the contrast-improving panel. This can create a perceived effect of contrast stretching. Existing tone mapping algorithms rely exclusively on software algorithms to stretch contrast. By using, for example, a design such as shown in FIG. 1, with the algorithmic elements described above, contrast stretching without tone mapping or other contrast synthesis may be achieved.

The present invention also may be utilized for maintaining constant gamut over a wide range of luminance values. An expected representation of the chromaticity (x, y) for different luminance values follows a surface outlined the first drawing. However, the measured luminance of a standard display at the maximum codewords for the primaries creates an inclined top triangle as outlined in the first drawing.

However, some display systems demonstrate a gamut limiting effect as described by the bottom figure. The projection of the color gamut onto the chromaticity axes (x, y) is reduced in area for higher luminance values until it reduces to a single point at maximum drive values for the individual color primaries (R=G=B=1.0 in normalized drive values). This point is usually the white point of the system.

Figure 6:
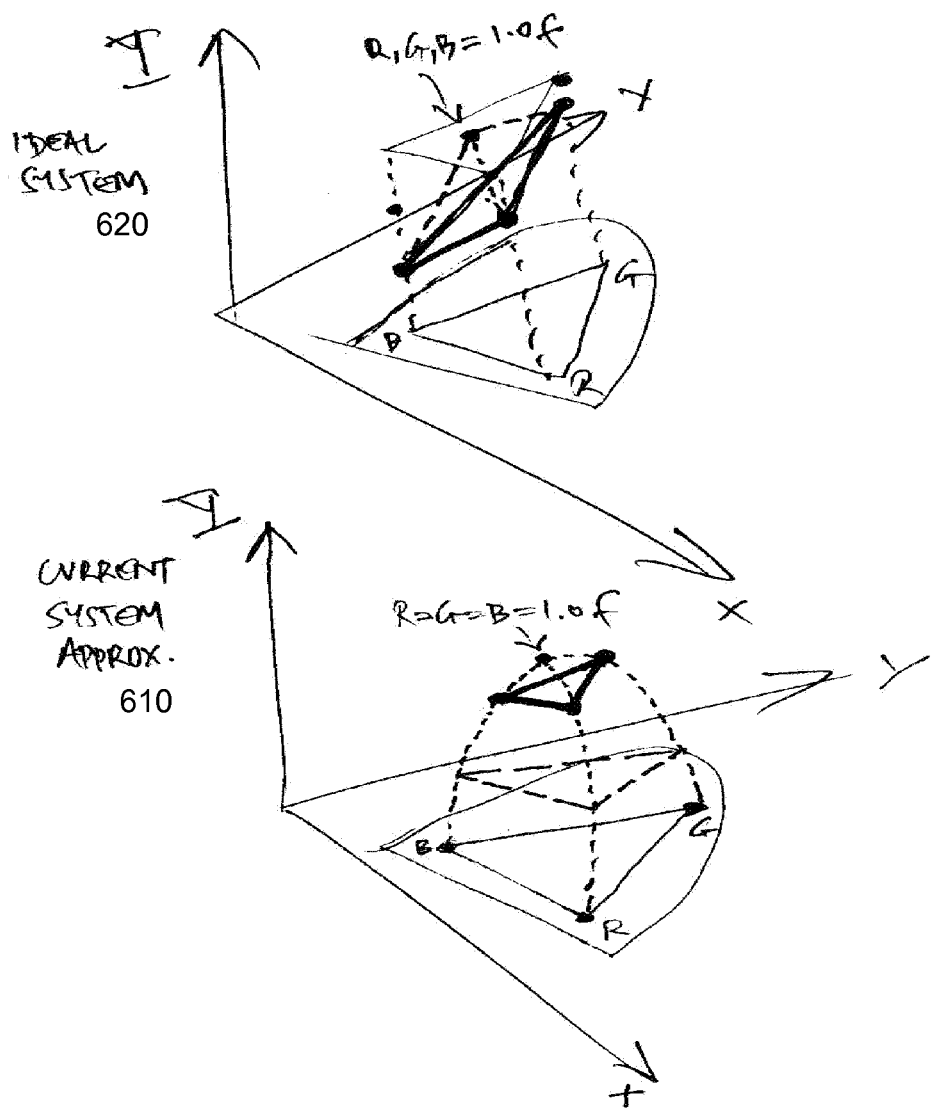
FIG. 6 is an illustration of a color diagram describing aspects of various embodiments of the invention.

By using a non-uniform current drive for the 3 primaries, the maximum input codewords for the individual primaries can give us a flat-topped triangle at the higher luminance levels there by increasing the color gamut and making the system demonstrate a more uniform projection on the chromaticity plane at higher luminance values (See FIG. 6, comparison of current system 610 and "ideal" system 620).

The present invention includes the use of RGB individually controlled tristimulus based backlights (e.g., LEDs, arranged in, for example, an edge lit configuration, direct lit array, or other arrangement). By scaling the current drives to the RGB individually controlled tristimulus LED backlight, the 3D surface of the luminance vs chromaticity of colors that represented may be adjusted. Luminance control is primarily from the dimming plane and the combination of the LED backlight and the dimming plane, scaling the color drives to the LEDs allows for wider color gamut at higher luminance values. For a target display luminance, the luminance vs current characterization curves may be used to determine/create the right scaling parameters for a current drive designed for better control of color gamut at that target luminance. This forms a basis for a global backlight controller embodiment.

The global backlight controller embodiment can be used, for example, on a plurality of LEDs which are closely spaced to create an edge lit zonal dimming backlight on conjunction with the color LCD and the dimming plane. By working on a plurality of LEDs at a time, the global backlight controller embodiment can also be used for correcting drifts in the output wavelength of light from a zone with luminance and maintain more accurate color properties at higher wavelengths.

The present invention includes computation of a color primary rotation matrix from a sparse data set. Given a sparse set of tristimulus primaries (R, G, B) as input images to the display system and their corresponding luminance (Y) and chromaticity coordinates (x, y), we could arrive at the optimum color rotation matrix for converting the RGB values to their corresponding XYZ values on the concerned display in the following manner:

$$A = [P1 P2 P3 \ldots Pn]T$$

where $P_x = [R\ G\ B]_x$ for the x input sample primaries $$B = [M1 M2 M3 \ldots Mn]T$$

where $M_x = [X\ Y\ Z]_x$ for the x output luminance/chromaticity

For example, let the color rotation matrix be:

$$x = \begin{vmatrix} RX & RY & RZ \\ GX & GY & GZ \\ BX & BY & BZ \end{vmatrix}$$

This could be expressed as a linear system of equations of the form:

$$Ax = B$$

and compute the rotation matrix x using the pseudo-inverse as:

$$x = (A^T A)^{-1} A^T B$$

This computed color rotation matrix would be optimized for minimum least square color distorting in the XYZ space given the number of sample data points that we have captured. Given more uniformly spaced data points, the computed color rotation matrix would be a more accurate representation of the true rotation operation by the display.

The present invention includes extending viewing angles in multi-modulated display systems. The use of existing LCD panels without red, green or blue color filters allows for much greater resolution of contrast enhancement as used as a background or foreground panel with another panel. This extra resolution becomes even more important when these dimming panels are coupled with different resolution color LCD panels or with similar scaled color LCD panels, as it allows for adjustable viewing angles across the display with minimized visual artifacts.

In the case where the base panel has the pixels (e.g., sub-pixels compared to other modulators in the same image chain) in clusters of four in a square configuration (2×2), even greater control is possible as this doubles the pixel/sub-pixel resolution in both horizontal and vertical directions. Existing image processing techniques for image scaling can be applied to these sub-pixel dimming regions if treated as individual control points, allowing for variable viewing angles and distances. To widen viewing angles as to accommodate multiple simultaneous viewers, a Gaussian or similar low pass filter can be applied as indicated by the spatial and range filtering embodiment in FIG. 4D.

The present invention includes controlling backlights for constant color. Traditional methods for setting display backlight light levels and color involve selecting from a set of voltage or current levels that drive the light. These do not factor in the changes to the color or luminance due to component or environmental temperatures, component age, or other factors. Our method of backlight control involves sending to the display a target color and luminance (usually with a scaled RGB target value), which is then compared with the values coming from a calibrated light and color sensor that is directly coupled with the backlight, with corrections made using a feedback loop. This eliminates the warm-up time for the display to settle to a particular color, and any color or brightness drift over time. This feedback process can be accelerated by using a feed-forward feedback hybrid driver (for the purpose of real-time backlight changes). This allows the backlight to instantly respond to control changes while still maintaining the precision maintained by the color and light sensors.

Figure 7A:
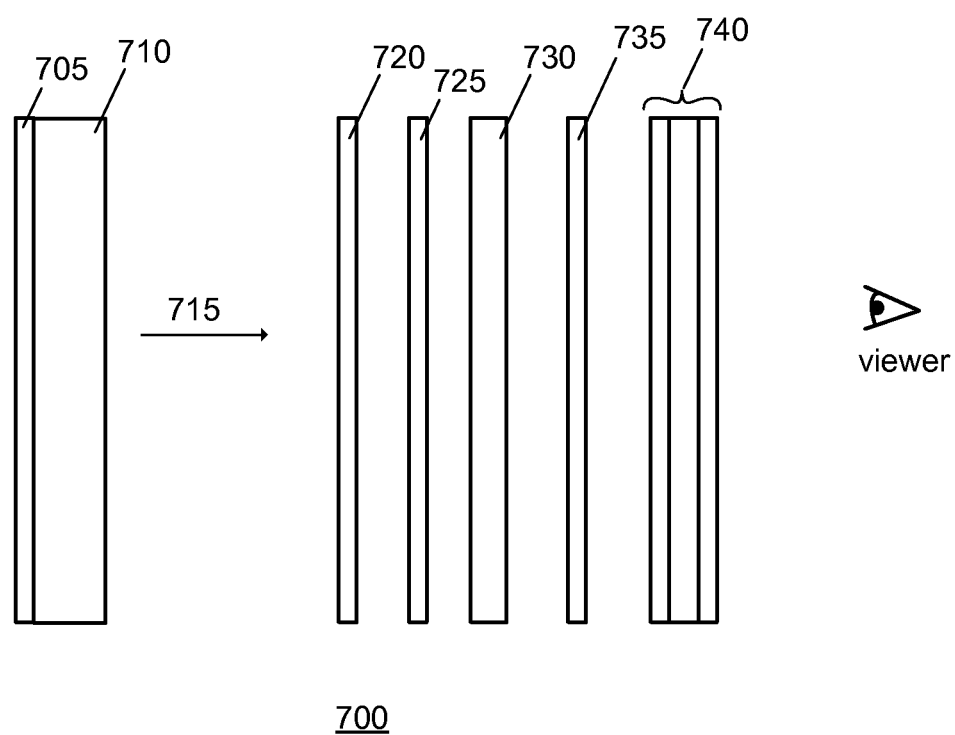
FIG. 7A is an arrangement of controllable panels according to an embodiment of the present invention.

The present invention may be implemented in a number of forms including combinations of hardware and processes described here and above. Another exemplary embodiment of a display device according to an embodiment of the invention is illustrated in FIG. 7A. A backlight 705 includes a reflective polarizer 710 that produces backlight 715. The reflective polarizer reflects and polarizes light that is directed toward the backlight's reflective polarizing surface(s). Such reflections include light that has been bounced back to the backlight from a reflective polarizer 725 because it was not of the desired orientation for further downstream processing by the display. Further reflection by the reflective polarizer changes the reflected lights polarization providing it another opportunity to pass the reflective polarizer 725 and be utilized in production of a desired image.

A diffuser stack 720 smoothes and diffuses the backlight 715, and the reflective or other type of polarizer passes light of a desired initial polarization for further downstream processing. A contrast-improving panel 730 (e.g., controllable "sub-pixel" polarizer—again "sub-pixel" because the pixels of the contrast-improving panel may be of higher resolution than its corresponding (e.g., downstream) image-generating panel) either locally dims or further locally dims (further locally dims in the case where backlight 710 is itself locally dimmed) light in the image/light chain from backlight to viewer. A diffuser stack 735 diffuses the locally dimmed light, and a image-generating panel 740 (e.g., LCD panel) imparts final modulation (e.g., color, brightness, and spatial resolution) into the light, which is then emitted for display to a viewer. A polarizer (usually absorptive) is included in front of the image-generating panel to realize the modulation imparted by the color panel. Additional antiglare or other light processing layers may be present in front of the image-generating panel.

Figure 7B:
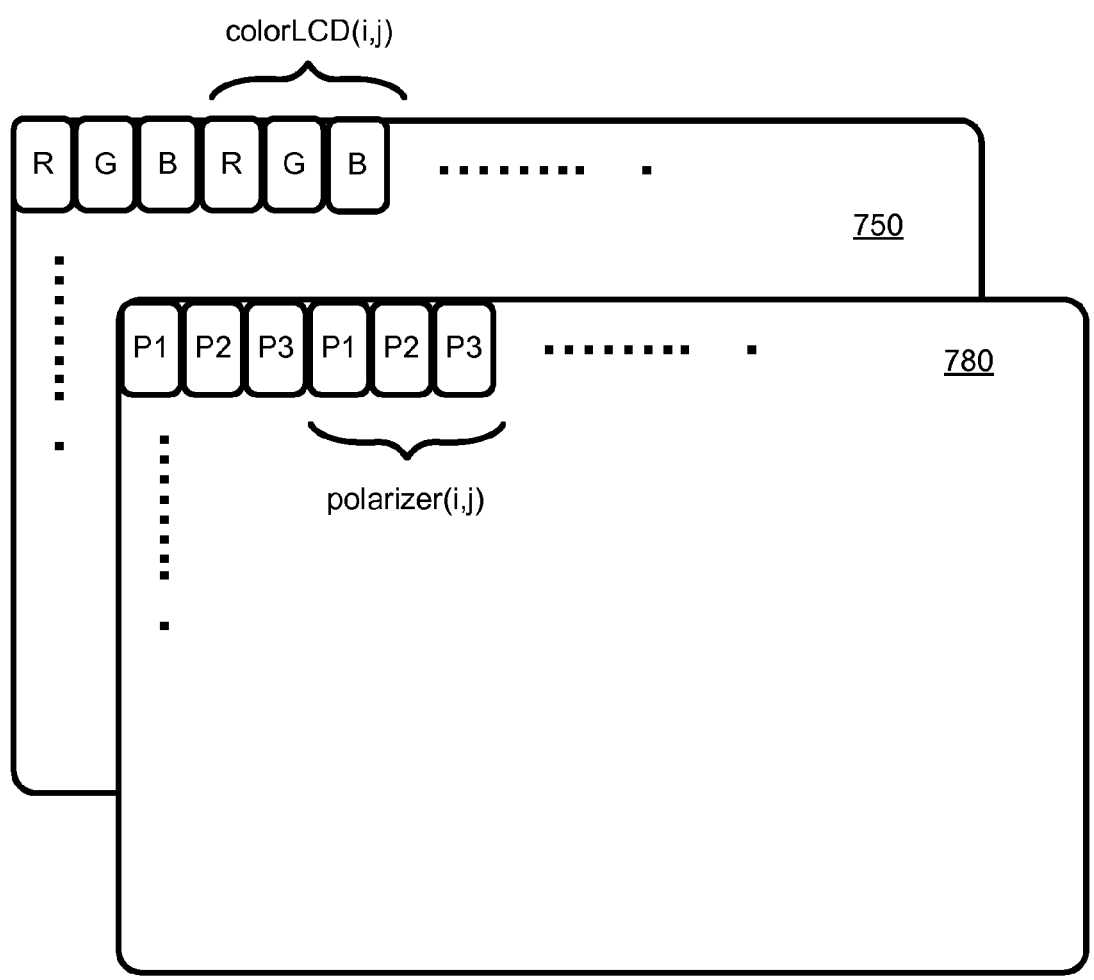
FIG. 7B is an arrangement of pixels on panels according to an embodiment of the present invention.

The discussion on pixels is now elaborated with reference to FIG. 7B which provides a diagram illustrating a possible relationship between pixels of an image-generating panel and pixels of a contrast-improving panel. An image-generating panel 750 includes sets of Red, Green and Blue (RGB) controllable elements each comprising a pixel of the color panel. For example, one pixel is defined as colorLCD (i,j), where I and j identify, for example, a row and column position of the pixel or RGB triad comprising the pixel. In this case, a similar location may be identified in the contrast-improving panel 780, where a set of three pixels corresponding to the RGB triad of colorLCD (i,j), P1, P2, and P3 of a group of local dimming pixels identified as polarizer (i,j) (however, P1, P2, and P3 may also be appropriately referred to as sub-pixels as they optically correspond to (or modulate) sub-pixel regions of the colorLCD pixels).

The present invention includes the use of modulators having different resolutions. In such cases it may not be possible to align pixels of the color and dimming panels as illustrated in FIG. 7B (however, alignment is not necessarily the case even when there is a direct correspondence between the size and arrangement between pixels of the local dimming panel and pixels of the color panel). Still, the pixels of the contrast-improving panel may be referenced as pixels of the contrast-improving panel or as sub-pixels of the color panel when they are of smaller size or greater resolution than the color panel pixels, which they jointly modulate to produce an image.

The invention may be further extended to displays with additional modulators. For example, a display with 3 modulating panels and techniques for driving the panels. By placing an additional controllable polarizer in front of the design discussed and illustrated in FIG. 7, light at an output of the display could be steered at different polarization angles, ether in a linear or circular manner. By using this system in conjunction with 3D polarized glasses, we could steer the objects on the display to either left or right eyes based on the modulation drive for the 3rd polarization panel. This stereoscopic-driving layer can be driven in various means using spatial, temporal, or color based stereoscopic methods along side traditional two-dimensional content, alone or simultaneously.

Figure 8:
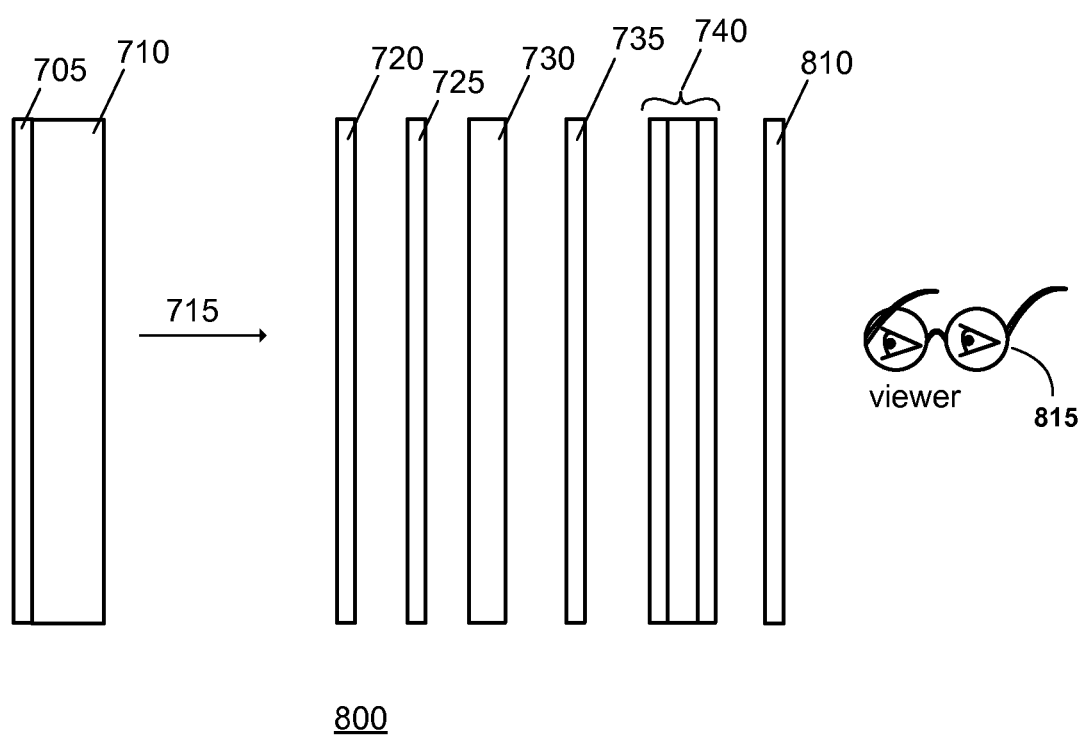
FIG. 8 is an arrangement of controllable panels according to various embodiments, including simultaneous 2D and 3D displays, of the present invention.

In FIG. 8, a display 800 includes all of the proposed parts associated with the FIG. 7 embodiment, with an additional controllable panel 810. The additional controllable panel may be, for example, a controllable polarizer similar in construction to the exemplary controllable polarizer described with respect to local dimming panel 730. However, here the panel is controlled to output images for respective channels. The channels may be, for example, a left eye viewing channel or a right eye viewing channel that may be separated for viewing by viewing glasses 815 that include different filters for the left eye and right eye.

For example, display 800 could be energized to alternately display a left view and a right view of a 3D image.

The images would then be separated into different corresponding viewing channels by energizing the additional controllable polarizer to polarize each of the images consistent with its viewing channel. For example, in a left and right polarization viewing system, the glasses 815 could be constructed to include a P polarization filter on the left eye lens and an S polarization filter on the right eye lens. In such a case, controllable panel 810 is energized to pass/convert light modulated with left image data to a P polarization and pass/convert light modulated with right image data to S polarization. In another example, the light may modulated with left or right image data in sections (e.g., light being emitted from the display at any given time contains parts of both a left and right channel image), and the controllable polarizer panel is also energized in sections and synchronized with the displayed image sections to convert those sectional images to the appropriate polarization and subsequent viewing through polarized filters by the left and right viewing channels.

Beyond 3D, the configuration of FIG. 8 allows the design to be extended to either more color accurate HDR or a 3D HDR display system. In conjunction with a method to drive the accurate compensate for color performance in 2D and 3D modes, a passive 3D display results. In addition, a hybrid 2D/3D display may be implemented (either driving the additional modulator for 3D channel separation, or to further refine a 2D image). To create a quality image, color and brightness correction may be performed over the total image areas. The display can be switchable between 2D and 3D operations, and can be configured to simultaneously drive 3D and 2D on the same screen. As 3D images are split between two eyes, they tend to be less bright. Additional color filters can be applied to the 2D image areas so that both 3D and 2D areas appear as the same brightness. Possible color correction can be applied as well.

Figure 9:
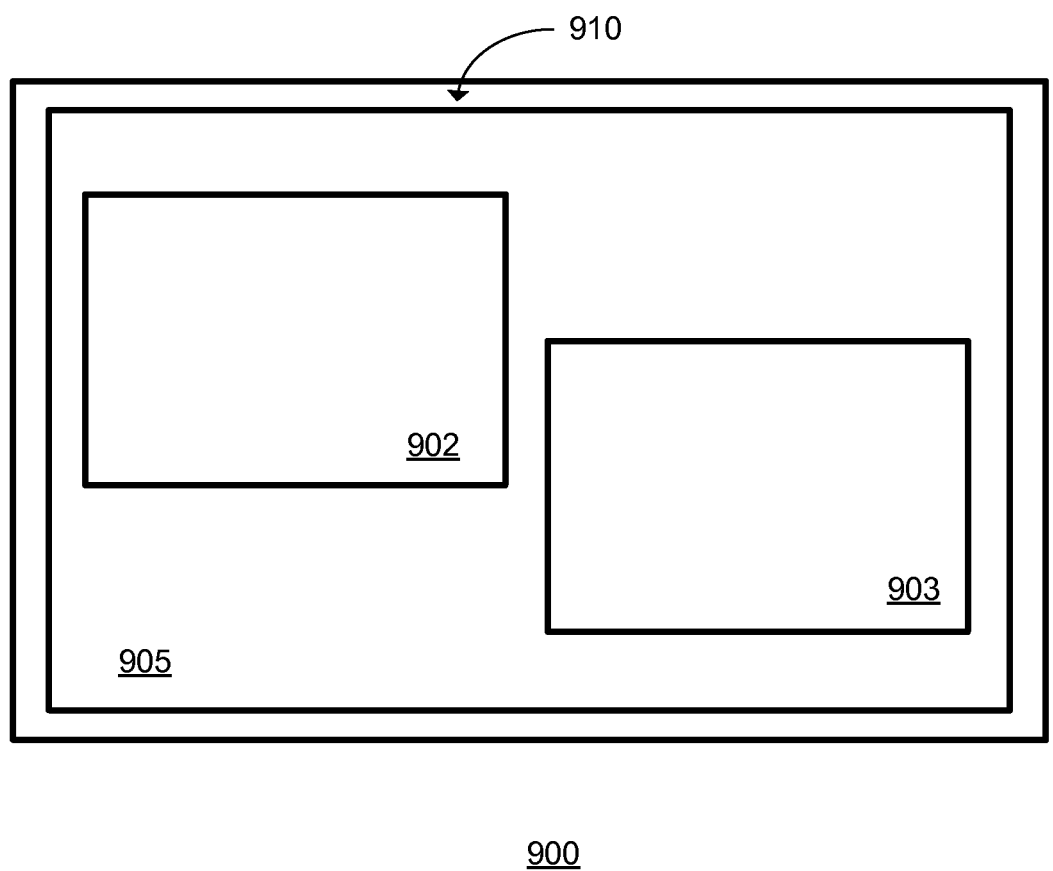
FIG. 9 is a drawing of one possible embodiment of a simultaneous 2D and 3D display according to the present invention.

In one embodiment, the additional controllable panel 810 is utilized for both 2D and 3D displays, and for providing a completely black border around the simultaneously displayed 2D and 3D images. As shown in FIG. 9, a display 900 is energized to provide a 2D display area 902 and 3D display area 903. In the 2D display area 902, the additional controllable panel 810 is utilized to enhance the dynamic range and black levels of the 2D display. Simultaneously, in the 3D display area 903, the additional controllable panel 810 is utilized to steer polarization of the left or right channel image being displayed to a polarization consistent with the corresponding left or right viewing channel. Finally, in border areas surrounding the 2D and 3D display areas, the additional controllable panel 810 is utilized to increase blackness (e.g., making a black boarder darker) or otherwise enhance the border area.

Variances in any particular 3D implementation may include, for example, a mix of shutter styles, per pixel steering, and brightest area chroma-based techniques, alongside 2D images as well. For example, for shutter style, one embodiment alternatively displays left and right images with steering of entire image to left or right eye with polarization layer (albeit at a reduced, or ½ frame rate). For a pixel steering embodiment, where left and right images differ, steering may be performed at alternate pixels to one eye or the other (albeit at a reduced, ½ resolution per image). In a brightest area embodiment, each pixel from both eye's images you find the highest luminance, then using the delta luminance between the two images steer the right light proportion to both eyes (albeit at a reduction of color resolution in the dimmer channel).

The invention includes enabling and/or disabling high dynamic range features on a HDR display using software. For example, the present invention includes packing a software system that enables HDR video/display capability when enabling a plug-in or activating a mode in a graphics driver. This would allow the user to switch between LDR (low dynamic range) mode and HDR (high dynamic range) mode at the click of a button the graphics driver UI and that would enable and disable HDR capability on a display with any of the hardware designs that have been described in this disclosure. Similarly, enabling of 2D and 3D modes may be performed through software or plug-ins installed on a system utilizing the described displays.

In part, the present invention has been described using the terms image-generating panel and contrast-enhancing panel. However, it should be understood that both panels generate images, and both panels impart contrast into a final image for display. The image-generating panel, in most described embodiments, imparting color and contrast through a combination of filtering and brightness modulation, and the contrast-improving panel imparting contrast, or enhancing contrast, via brightness modulation. And it should also be understood that the contrast-improving panel could also include color filtering or other variations of function in one or more of the contrast-improving panel and/or the image-generating panel.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. Furthermore, the inventors recognize that newly developed technologies not now known may also be substituted for the described parts and still not depart from the scope of the present invention. All other described items, including, but not limited to panels, LCDs, polarizers, controllable panels, displays, filters, glasses, software, and/or algorithms, etc. should also be considered in light of any and all available equivalents.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art based on the present disclosure.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, HD-DVD, Blue-ray, CD-ROMS, CD or DVD RW+/−, micro-drive, and magneto-optical disks, ROMs, RAMs, EPROMs, EEPROMs, DRAMs, VRAMs, flash memory devices (including flash cards, memory sticks), magnetic or optical cards, SIM cards, MEMS, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, calculating pixel/sub-pixel blurring of a local dimming panel, calculating color correction or characterizations, preparing image signals and applying them to driver and/or other electronics to energize backlights, panels, or other devices in a display, calculating luminance values, interpolating, averaging, or adjusting luminance based on any of the factors described herein, including a desired luminance for a pixel or region of an image to be displayed, and the display, storage, or communication of results according to the processes of the present invention.

The present invention may suitably comprise, consist of, or consist essentially of, any of element (the various parts or features of the invention) and their equivalents as described herein. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

What is claimed is:

1. A display comprising,
    a backlight, an image-generating panel, a contrast-improving panel, and a polarizer positioned between the image generating panel and the contrast improving panel, wherein the polarizer is operative as both an analyzing polarizer for the contrast-improving panel and an orientation polarizing layer for the image-generating panel and further wherein the image-generating panel comprises a color LCD panel that receives light from the backlight and transmits light to the contrast-improving panel that comprises a monochrome LCD panel wherein the resolution of the contrast-improving panel is greater than a resolution of the image-generating panel;
    a mid-stream diffuser positioned between the contrast-improving panel and the image generating panel and having a diffusion resolution greater than the image-generating panel; and
    a controller comprising an image-generating panel energization module and a contrast-improving panel energization module, the controller connected to energize both the image-generating panel and the contrast-improving panel with control data produced by the corresponding energization module,
    wherein energization of the contrast-improving panel comprising: extracting luminance values from an input image data received by the controller to produce a first intermediate data; intentionally blurring the image apart from the point spread function of the backlight; subpixel interpolating the first intermediate data to handle the difference between the resolution of the contrast-improvement panel and the image-generating panel to produce a second intermediate data; and filtering the second intermediate data to produce a smoothed energizing data for the contrast-improving panel, the smoothed energizing data improving viewing angle performance and maintaining high frequency detail in the input image data;
    wherein further energization of the image-generating panel is based in part on feedback from the contrast-improving panel energization module to the image-generation panel energization module.

2. The display according to claim 1, wherein a resolution of the contrast-improving panel is higher than the image-generating panel.

3. The display according to claim 1, wherein the image-generating panel comprises a color-filter based LCD panel having a same polarization rotating design as the contrast-improving panel.

4. The display according to claim 1, wherein the contrast-improving panel is inverted relative to the image-generating panel such that active layers of the panels are closer together.

5. The display of claim 1 further wherein the intentional blurring of the image produces an illumination profile by using the higher resolution capabilities of the contrast-improving panel.

6. A display comprising,
    a backlight, an image-generating panel, a contrast-improving panel, and a polarizer positioned between the image generating panel and the contrast improving panel, wherein the polarizer is operative as both an analyzing polarizer for the contrast-improving panel and an orientation polarizing layer for the image-generating panel and further wherein the image-generating panel comprises a color LCD panel that receives light from the backlight and transmits light to the contrast-improving panel that comprises a monochrome LCD panel;
    a mid-stream diffuser positioned between the contrast-improving panel and the image generating panel and having a diffusion resolution greater than the image-generating panel; and
    a controller comprising an image-generating panel energization module and a contrast-improving panel energization module, the controller connected to energize both the image-generating panel and the contrast-improving panel with control data produced by the corresponding energization module,
    wherein the controller is configured to input data from a media source of a standardized high resolution, the image-generating panel is selected to be capable of producing an image of the standardized high resolution and the contrast-improving panel is configured to increase contrast using a resolution different than a resolution of the image generating panel;
    wherein the resolution of the contrast-improving panel is greater than a resolution of the image-generating panel; and
    wherein energization of the contrast-improving panel comprising: extracting luminance values from the input data received by the controller to produce a first intermediate data; producing an illumination profile that is intentionally blurred apart from the point spread function of the backlight; subpixel interpolating the first intermediate data to handle the difference between the resolution of the contrast-improvement panel and the image-generating panel to produce a second intermediate data; and filtering the second intermediate data to produce a smoothed energizing data for the contrast-improving panel, the smoothed energizing data improving viewing angle performance and maintaining high frequency detail in the input data.

7. The display according to claim 6, wherein the contrast improving panel is backlight by at least one edge lit array of light sources.

8. A display comprising,
a backlight, an image-generating panel, a contrast-improving panel, and a polarizer positioned between the image generating panel and the contrast improving panel and further wherein the image-generating panel comprises a color LCD panel that receives light from the backlight and transmits light to the contrast-improving panel that comprises a monochrome LCD panel wherein the resolution of the contrast-improving panel is greater than a resolution of the image-generating panel;
wherein the image generating layer is backlight by at least one edge lit array of light sources, and
the display further comprising a contrast layer diffuser having a resolution that differs from the contrast improving panel and a controller configured to receive input image data and send control signals to energize the contrast-improving panel and the image-generating panel; and
wherein further energization of the contrast-improving panel comprising: extracting luminance values from the input image data to produce a first intermediate data; producing an illumination profile that is intentionally blurred apart from the point spread function of the backlight; subpixel interpolating the first intermediate data to handle the difference between the resolution of the contrast-improvement panel and the image-generating panel to produce a second intermediate data; and filtering the second intermediate data to produce a smoothed energizing data for the contrast-improving panel, the smoothed energizing data improving viewing angle performance and maintaining high frequency detail in the input image data.

9. A display comprising,
a backlight, an image-generating panel, a contrast-improving panel, and a polarizer positioned between the image generating panel and the contrast improving panel, wherein light from the backlight illuminates the image-generating panel that modulates the intensity and color of the light which illuminates the contrast-improving panel, the contrast-improving panel comprising a controllable polarizer and further wherein the image-generating panel comprises a color LCD panel and the contrast-improving panel that comprises a monochrome LCD panel wherein the resolution of the contrast-improving panel is greater than a resolution of the image-generating panel;
an upstream diffuser and a downstream diffuser, wherein the upstream diffuser has a relatively coarse diffusion resolution and is configured to diffuse a backlight configured to illuminate the upstream panel and the downstream diffuser has a relatively fine diffusion resolution configured to mask at least one of high frequency details and uncontrolled features of the upstream panel;
a controller configured to receive input image data and send control signals to energize the contrast-improving panel and the image-generating panel; and
wherein further energization of the contrast-improving panel comprising: extracting luminance values from the input image data to produce a first intermediate data; producing an illumination profile that is intentionally blurred apart from the point spread function of the backlight; subpixel interpolating the first intermediate data to handle the difference between the resolution of the contrast-improvement panel and the image-generating panel to produce a second intermediate data; and filtering the second intermediate data to produce a smoothed energizing data for the contrast-improving panel, the smoothed energizing data improving viewing angle performance and maintaining high frequency detail in the input image data.

10. A display comprising,
a backlight, an image-generating panel, a contrast-improving panel, and a polarizer positioned between the image generating panel and the contrast improving panel, wherein light from the backlight illuminates the image-generating panel that modulates the intensity and color of the light which illuminates the contrast-improving panel, the contrast-improving panel comprising a controllable polarizer and further wherein the image-generating panel comprises a color LCD panel and the contrast-improving panel that comprises a monochrome LCD panel wherein the resolution of the contrast-improving panel is greater than a resolution of the image-generating panel and wherein the contrast-improving panel intentionally blurs the image apart from the point spread function of the backlight;
a midstream diffuser that does not substantially alter the polarization of light being diffused and which has a diffusion resolution greater than a resolution of the upstream panel; and
an array of locally dimmed light sources,
wherein the image-producing panel produces a base version of an image to be displayed by the display and the contrast-improving panel further modulates the base image to produce the image to be displayed,
wherein the base image comprises a brightness intensity in a proportion to brightness intensities of the image to be displayed, and
wherein the base image comprises a subpixel interpolation to handle the difference between the resolution of the contrast-improvement panel and the image-generating panel to produce a second intermediate data; and
a filtering to improve the viewing angle performance and maintain high frequency detail in the input image data.

11. The display of claim 10 further wherein the intentional blurring of the image produces an illumination profile by using the higher resolution capabilities of the contrast-improving panel.

12. A modulator comprising,
an upstream modulating panel, a downstream modulating panel, and an analyzing-orienting layer between the panels operative as an analyzer with respect to the upstream modulating panel and as an orientation layer with respect to the downstream modulating panel, wherein the upstream modulating panel comprises an image-generating panel that modulates light by intensity and color and the downstream modulating panel comprises a contrast-improving panel, the contrast-improving panel comprising a controllable polarizer and further wherein the image-generating panel comprises a color LCD panel and the contrast-improving panel that comprises a monochrome LCD panel wherein the resolution of the contrast-improving panel is greater than a resolution of the image-generating panel;

a diffusing element positioned between the panels wherein the diffuser has a diffusing resolution of less than a modulating resolution of the upstream panel wherein the upstream panel is inverted relative to the downstream panel;

a controller configured to receive input image data and send control signals to energize the contrast-improving panel and the image-generating panel; and wherein further energization of the contrast-improving panel comprising: extracting luminance values from the input image data to produce a first intermediate data; producing an illumination profile that is intentionally blurred apart from the point spread function of the backlight; subpixel interpolating the first intermediate data to handle the difference between the resolution of the contrast-improvement panel and the image-generating panel to produce a second intermediate data; and filtering the second intermediate data to produce a smoothed energizing data for the contrast-improving panel, the smoothed energizing data improving viewing angle performance and maintaining high frequency detail in the input image data.

13. A modulator comprising, an upstream modulating panel, a downstream modulating panel, and an analyzing-orienting layer between the panels operative as an analyzer with respect to the upstream modulating panel and as an orientation layer with respect to the downstream modulating panel, wherein the upstream modulating panel comprises an image-generating panel that modulates light by intensity and color and the downstream modulating panel comprises a contrast-improving panel, the contrast-improving panel comprising a controllable polarizer and further wherein the image-generating panel comprises a color LCD panel and the contrast-improving panel that comprises a monochrome LCD panel wherein the resolution of the contrast-improving panel is greater than a resolution of the image-generating panel;

a diffusing element configured so as to not substantially alter polarization of light being diffused and which is positioned between the panels wherein the diffusing element has a diffusing resolution of less than a modulating resolution of the upstream panel;

a controller configured to receive input image data and send control signals to energize the contrast-improving panel and the image-generating panel; and wherein further energization of the contrast-improving panel comprising: extracting luminance values from the input image data to produce a first intermediate data; producing an illumination profile that is intentionally blurred apart from the point spread function of the backlight; subpixel interpolating the first intermediate data to handle the difference between the resolution of the contrast-improvement panel and the image-generating panel to produce a second intermediate data; and filtering the second intermediate data to produce a smoothed energizing data for the contrast-improving panel, the smoothed energizing data improving viewing angle performance and maintaining high frequency detail in the input image data.

14. The modulator according to claim 13, wherein the panels each include an active layer and the panels are oriented such that the active layers are as close together as possible.

15. A display comprising, a pair of LCD panels in a light path each comprising a plurality of layers, wherein a first of the LCD panels is oriented differently than a second of the LCD panels wherein the orientation brings active layers of the panels closer together;

wherein the first of the LCD panels comprises an upstream modulating panel and further comprises an image-generating panel that modulates light by intensity and color and the second of the LCD panels comprises a downstream modulating panel and further comprises a contrast-improving panel, the contrast-improving panel comprising a controllable polarizer and further wherein the image-generating panel comprises a color LCD panel and the contrast-improving panel that comprises a monochrome LCD panel wherein the resolution of the contrast-improving panel is greater than a resolution of the image-generating panel;

further comprising a high frequency diffuser between the LCD panels, wherein the high frequency diffuser is a diffuser configured to diffuse light at a resolution higher than a resolution of the first panel;

a controller configured to receive input image data and send control signals to energize the contrast-improving panel and the image-generating panel; and wherein further energization of the contrast-improving panel comprising: extracting luminance values from the input image data to produce a first intermediate data; producing an illumination profile that is intentionally blurred apart from the point spread function of the backlight; subpixel interpolating the first intermediate data to handle the difference between the resolution of the contrast-improvement panel and the image-generating panel to produce a second intermediate data; and filtering the second intermediate data to produce a smoothed energizing data for the contrast-improving panel, the smoothed energizing data improving viewing angle performance and maintaining high frequency detail in the input image data.

16. The modulator according to claim 15, wherein the LCD panels are illuminated by a locally dimmed backlight.

* * * * *